United States Patent
Kaneko

(10) Patent No.: US 7,261,474 B2
(45) Date of Patent: Aug. 28, 2007

(54) CONNECTION STRUCTURE BETWEEN OPTICAL ELEMENT AND OPTICAL FIBER, CONNECTION METHOD THEREOF, AND OPTICAL MODULE

(75) Inventor: Tsuyoshi Kaneko, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 10/769,874

(22) Filed: Feb. 3, 2004

(65) Prior Publication Data

US 2004/0165825 A1  Aug. 26, 2004

(30) Foreign Application Priority Data

Feb. 10, 2003  (JP) .............................. 2003-032407

(51) Int. Cl.
*G02B 6/42* (2006.01)
(52) U.S. Cl. ......................................... 385/88; 385/31
(58) Field of Classification Search ................. 385/39, 385/31, 33, 49, 88–94, 40, 51, 35
See application file for complete search history.

(56) References Cited

U.S. PATENT DOCUMENTS

| 5,143,659 | A | * | 9/1992 | Hamblen et al. ............. 264/1.1 |
| 5,214,276 | A | * | 5/1993 | Himoto et al. ............. 250/214.1 |
| 5,498,684 | A | | 3/1996 | Bender |
| 5,707,684 | A | | 1/1998 | Hayes et al. |
| 6,773,169 | B2 | * | 8/2004 | Ebeling et al. ................ 385/88 |
| 6,932,516 | B2 | * | 8/2005 | Ouchi et al. ................... 385/88 |
| 6,944,371 | B2 | | 9/2005 | Kaneko |
| 2004/0156597 | A1 | | 8/2004 | Kaneko |

FOREIGN PATENT DOCUMENTS

| JP | A-59-192219 | 10/1984 |
| JP | U-59-161116 | 10/1984 |
| JP | A-60-156023 | 8/1985 |
| JP | 09-197196 | * 7/1997 |
| JP | A-09-197196 | 7/1997 |
| JP | A 2000-067449 | 3/2000 |
| JP | A 2001-059923 | 3/2001 |
| JP | A-2001-518206 | 10/2001 |
| JP | A 2002-331532 | 11/2002 |
| JP | A-2004-240361 | 8/2004 |
| JP | A-2004-245861 | 9/2004 |
| JP | A-2005-122220 | 5/2005 |

* cited by examiner

*Primary Examiner*—Sarah Song
(74) *Attorney, Agent, or Firm*—Oliff & Berridge, PLC

(57) ABSTRACT

To provide a connection structure between an optical element and an optical fiber, which makes it possible to inexpensively secure optical transmission between the optical element and the optical fiber. A connection structure between an optical element and an optical fiber of includes an electro optical element, an optical fiber, and a connecting part. The electro optical element includes an optical surface and a base member provided on the optical surface. The connecting part is coupled to an end surface of the optical fiber and a top surface of the base member.

30 Claims, 18 Drawing Sheets

CONNECTION STRUCTURE BETWEEN OPTICAL ELEMENT AND OPTICAL FIBER, CONNECTION METHOD THEREOF, AND OPTICAL MODULE

BACKGROUND OF THE INVENTION

1. Field of Invention

The present invention relates to a connection structure between an optical element and an optical fiber, and a connection method to couple an optical element and an optical fiber.

Furthermore, the present invention relates to an optical module and an optical transmission unit including the connection structure.

2. Description of Related Art

Recently there exist tendencies of high-speed and large-amount data transmission in the information and communication technology sector so that development of optical communication technologies is in demand. In related art optical communications, an electrical signal is usually converted into an optical signal, which is transmitted through optical fibers. Then the optical signal received is converted into an electrical signal. Such a converting operation from the electrical signal to the optical signal and then from the optical signal to the electrical one is performed by optical elements. For implementation of optical communications by such a converting method, it is necessary to precisely align the optical fiber and the optical element for the purpose of reducing optical loss.

However, an optical surface (i.e., a plane of incidence or an emitting plane) of the optical element generally has a fine structure and a diameter of the optical fiber is minute in size. Therefore, accuracy is required for the alignment between the optical element and the optical fiber.

SUMMARY OF THE INVENTION

The present invention provides a connection structure between an optical element and an optical fiber that makes it possible to inexpensively secure optical transmission between the optical element and the optical fiber.

The invention also provides a connection method to couple an optical element and an optical fiber that is superior in productivity and does not require any accurate alignment between the optical element and the optical fiber.

The invention further provides an optical module and an optical transmission unit having the connection structure.

A connection structure in one aspect of the present invention includes an optical element having an optical surface and a base member that is formed on the optical surface, an optical fiber, and a connecting part that joins an end surface of the optical fiber and a top surface of the base member.

In this case, at least a part of the end surface of the optical fiber can be positioned to face the top surface of the base member.

A connection structure in another aspect of the present invention includes an optical element having an optical surface and a base member that is formed on the optical surface, an optical fiber having a core and a clad, and a connecting part that joins an end surface of the core and the top surface of the base member.

In this case, at least a part of the end surface of the core can be positioned to face the top surface of the base member.

In this present application, an "optical surface" means a plane of an optical element, from which light is emitted or into which light is introduced. For example, if the optical element is a light emitting element, the optical surface is a plane from which light is emitted (an emitting plane). If the optical element is a light receiving element, the optical surface is a plane into which the light is introduced (a plane of incidence).

Also in this present application, "to face" means not only the condition where two planes are facing in parallel each other, but also the condition where two planes are facing each other with a certain angle between them.

Here, there is no specific restriction on the shape of the end surface of the optical fiber as long as the connecting part can be provided. The end surface may be round or oval in shape. Likewise, there is no specific restriction on the sectional shape of the connecting part.

Furthermore, "base member" means a member having a top surface where the connecting part can be provided, and "top surface of a base member" means a surface where the connecting part is provided. The top surface of the base member may be a flat surface or may be a curved surface if only the connecting part can be provided thereon.

The connection structure of an aspect of the present invention having such a structure as described above can provide a connection structure between an optical element and an optical fiber that makes it possible to inexpensively secure optical transmission between the optical element and the optical fiber.

Also in an exemplary embodiment of the invention, there is no specific restriction on the material of the optical fiber. For example, an aspect of the present invention can be applied to any optical fiber of quartz glass, plastic, a complex material of plastic and quartz, and multicomponent glass.

Also in the connection structure according to an aspect of the invention, the refractive index of the connecting part can be greater than the refractive index of the clad of the optical fiber.

In the connection structure according to an aspect of the invention, the refractive index of the connecting part can be almost equal to the refractive index of the core of the optical fiber. With this structure, light reflection at a boundary between the connecting part and the core can be reduced so that optical loss at the boundary can be reduced.

Also in the connection structure according to an aspect of the invention, the height of the end surface of the core can be different from the height of the end surface of the clad at the end part of the optical fiber joined to the connecting part.

In this case, the core can be not covered by the clad at the end part. This setup makes it possible to form a convex portion by the core and clad at the end part.

Here, an area surrounding the connecting part can be covered by a sealant at the end part. With this structure, the connecting part can surely be fixed onto the end surface of the core. As a result, it becomes possible to obtain the connection structure with a higher yield.

In this case, the refractive index of the sealant can be smaller than the refractive index of the core of the optical fiber and the refractive index of the connecting part.

Also in this case, the refractive index of the connecting part can be almost equal to the refractive index of the core of the optical fiber, and the refractive index of the sealant can be almost equal to the refractive index of the clad of the optical fiber. With this structure, the connecting part and the sealant can be provided with the same functions as those of the core and the clad of the optical fiber, respectively.

Accordingly, the optical loss can be reduced.

Moreover in this case, it is possible to have the clad not cover the core at the end part. Accordingly, a concave portion is formed by the core and clad at the end part. With this structure, the connecting part can surely be fixed onto the end surface of the core. As a result, it becomes possible to obtain the connection structure with a higher yield.

In the connection structure according to an aspect of the invention, the connecting part can be formed by hardening a liquid material that is hardened by charging energy.

In this case, the connecting part can be composed of ultraviolet curable resin.

In the connection structure according to an aspect of the invention, the optical element can be any of a surface emitting semiconductor laser, a semiconductor light emitting diode, an electroluminescent (EL) device and a photo diode.

In the connection structure according to an aspect of the invention, the base member can be composed of a material where light of a predetermined wavelength goes through. Here, "go through" means that light entering the base member is emitted from the base member after entering, and includes not only the case where all of the light entering the base member is emitted from the base member, but also the case where a part of light entering the base member is emitted from the base member.

The top surface of the base member can be circular or oval.

The top surface of the base member can be a curved surface.

The top surface of the base member can make an acute angle with a surface that intersects the top surface at a side part of the base member. With this structure, in the case where the connecting part is formed by applying a liquid agent to make the connecting part precursor, and then by hardening it, it can reduce or prevent a side surface of the base member from becoming wet with the liquid agent. As a result, the connecting part of the required shape and size can be formed.

The upper part of the base member can be formed in a reverse taper manner. Here, "upper part of the base member" means an area of the base member that is in the vicinity of the top surface of the base member. With this structure, in the case where the connecting part is formed by applying a liquid agent to make the connecting part precursor, and then by hardening it, an angle formed by the top surface and the side surface of the base member can be reduced while keeping the stability of the base member. This reduces or prevents the side surface of the base member from becoming wet with the liquid agent. As a result, the connecting part of the required shape and size can be formed.

The refractive index of the base member can be almost equal to the refractive index of the connecting part. In this case, if the refractive index of the base member is almost equal to the refractive index of the core of the optical fiber, too, the refractive indexes of the base member, the connecting part, and the core are almost equal. Namely, since the refractive indexes of all areas where light goes through are almost equal, the reflection of light at each interface of these areas can be reduced. As a result, the optical loss of light at each interface can be reduced.

An optical module according to an aspect of the invention includes the connection structure of an aspect of the invention and a semiconductor chip that is electrically coupled to the optical element.

The optical module of an aspect of the present invention having the connection structure makes it possible to configure a connection structure between an optical element and an optical fiber that can secure optical transmission between the optical element and the optical fiber. In comparison with an ordinary optical module in which a lens is additionally placed between the optical fiber and optical element, the optical module of an aspect of the present invention requires an alignment between the optical fiber and optical element via the connecting part and the base member so that the alignment work can be simplified. Furthermore, the connection structure directly connecting the optical element and the optical fiber via the connecting part and the base member makes any highly precise alignment unnecessary. Consequently it becomes possible to realize a simplified, downsized and low-cost unit.

An optical transmission unit of an aspect of the present invention includes an optical fiber, and a light emitting element that has a plane of incidence and lets a light emitted from the plane of incidence into an end surface of the optical fiber. The optical transmission unit also includes a semiconductor chip electrically coupled to the light emitting element, a light receiving element that has an emitting plane and introduces a light emitted from the other end surface of the optical fiber through the emitting plane, and a semiconductor chip electrically coupled to the light receiving element. Here, at least one of the connection structure between the light emitting element and the optical fiber, and the connection structure between the light receiving element and the optical fiber, is the connection structure according to an exemplary embodiment of the present invention, which is described above.

In this case, the optical transmission unit of an aspect of the present invention can further include another base member, and at least a part of the connecting part can be provided on the another base member.

A connection method to couple an optical element and an optical fiber in one aspect of the present invention includes the following processes: (a) forming a connecting part precursor by applying a liquid agent to at least one of an end surface of the optical fiber and a top surface of a base member that is formed on an optical surface of the optical element, and (b) forming a connecting part by hardening the connecting part precursor while joining the end surface of the optical fiber and the top surface of the base member via the connecting part precursor.

In this case, the process (b) can include joining the end surface of the optical fiber and the top surface of the base member via the connecting part precursor while making at least a part of the end surface of the optical fiber face the top surface of the base member.

The connection method to couple an optical element and an optical fiber of an aspect of the present invention achieves high productivity. Moreover, a precise alignment between the optical element and the optical fiber is not required any more. In addition, a simplified method is available to join the optical element and the optical fiber via the connecting part and the base member.

A connection method to couple an optical element and an optical fiber in another aspect of the present invention includes the following processes: (a) forming a connecting part precursor by applying a liquid agent to at least one of an end surface of the core of the optical fiber and a top surface of a base member that is formed on an optical surface of the optical element, and (b) forming a connecting part by hardening the connecting part precursor while joining the end surface of the core and the top surface of the base member via the connecting part precursor.

In this case, the process (b) can include joining the end surface of the core and the top surface of the base member via the connecting part precursor while making at least a part of the end surface of the core face the top surface of the base member.

In this case, the connection method can further include forming the base member on the optical surface of the optical element before the process (a).

Also in this connection method to couple an optical element and an optical fiber, the height of the end surface of the core can be different from the height of the end surface of the clad.

The connection method to couple an optical element and an optical fiber of an aspect of the present invention achieves high productivity. Moreover, a precise alignment between the end surface and the top surface of the base member is not required any more. In addition, a simplified method is available to join the optical element and the optical fiber via the connecting part.

In this connection method to couple an optical element and an optical fiber, the base member can be composed of a material where light of a predetermined wavelength goes through.

In the connection method to couple an optical element and an optical fiber of the invention, the liquid agent is applied by an ink-jet method. In this method, the dispensing volume of the liquid agent is precisely adjusted. Therefore, it becomes possible to precisely place a connecting part precursor onto either or both of the end surface of the optical fiber and the top surface of the base member.

In the connection method to couple an optical element and an optical fiber of an aspect of the invention, the connecting part precursor can be hardened by charging energy.

In the connection method to couple an optical element and an optical fiber of the invention, the optical element can be any of a surface emitting semiconductor laser, a semiconductor light emitting diode, an EL device and a photo diode.

DETAILED DESCRIPTION OF PREFERRED EMBODIMENTS

The following sections describe exemplary embodiments of the present invention while referring to the figures.

First Exemplary Embodiment

1. Connection Structure between Optical Element and Optical Fiber

Figure 1A:
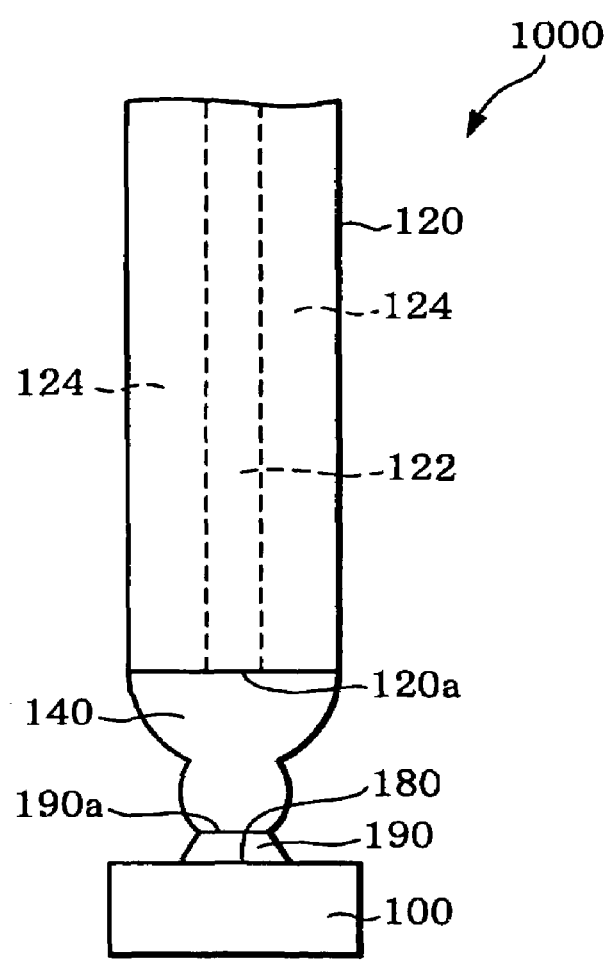
FIG. 1(A) shows a side view of a connection structure between an optical element and an optical fiber according to a first exemplary embodiment of the invention.
Figure 1B:
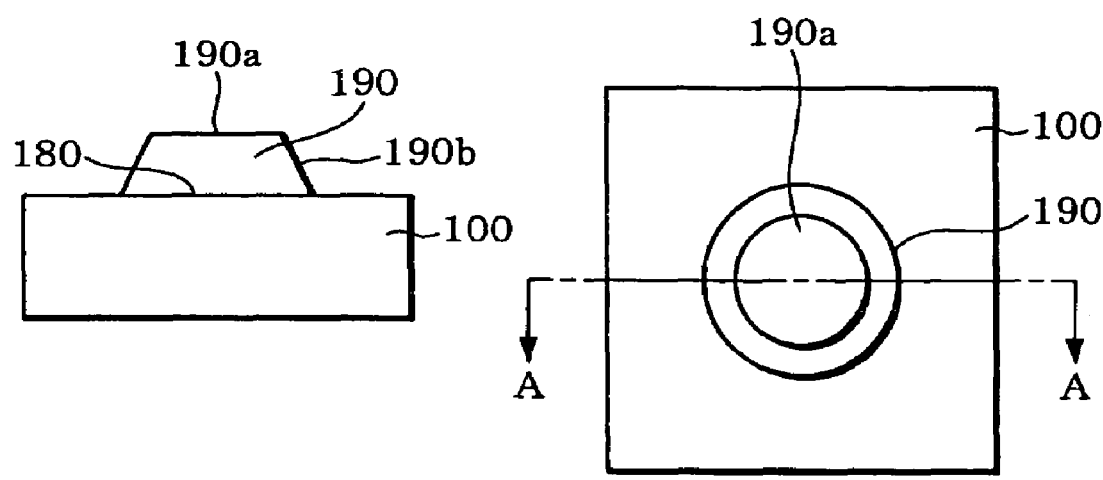
FIG. 1(B) shows an elevation view of the optical element shown in FIG. 1(A)

FIG. 1(A) shows a side view of a connection structure between an optical element and an optical fiber according to a first exemplary embodiment of the present invention. A connection unit 1000 is indicated in FIG. 1(A) as the connection structure. In addition, FIG. 1(B) shows a schematic of an electro optical element 100 shown in FIG. 1(A). Here, in FIG. 1(B), a right schematic shows a plan view of the electro optical element 100, and a left shows a sectional view along plane A—A of the right schematic.

The connection unit 1000 includes the electro optical element 100, an optical fiber 120, and a connecting part 140 as shown in FIG. 1(A). The connecting part 140 is provided on a top surface 190a of a base member 190. The base member 190 is provided on an optical surface 180 of the electro optical element 100. Each component of the connection unit 1000 is described below.

Optical Element

The electro optical element 100 includes the optical surface 180. The electro optical element 100 is a light emitting element or a light receiving element. For example, the electro optical element 100 is a light emitting element to emit light in a direction perpendicular to a substrate, or it is a light receiving element to introduce a light coming in a direction perpendicular to a substrate. When the electro optical element 100 is a light emitting element, the light emitted from an optical surface 180 is introduced into the optical fiber 120 through the base member 190 and the connecting part 140 with high efficiency. If the electro optical element 100 is a light receiving element, the light emitted from the optical fiber 120 is introduced via the optical surface 180 through the connecting part 140 and the base member 190 with high efficiency.

The electro optical element 100 is, for example, any of a surface emitting semiconductor laser, a semiconductor light emitting diode, an EL device and a photo diode.

The electro optical element 100 is coupled to the optical fiber 120 through the connecting part 140, which is formed on the top surface 190a of the base member 190, as shown in FIG. 1(A). Namely, the relative position of the electro optical element 100 to the optical fiber 120 is fixed by the connecting part 140. In the connection unit 1000, the optical surface 180 and the top surface 190a of the base member 190 are facing at least a part of an end surface 120a of the optical fiber 120.

Base Member

The base member 190 is provided on the optical surface 180 of the electro optical element 100. The base member 190 is composed of a material where light of a predetermined wavelength goes through. The base member 190 and a layer forming the electro optical element 100 can be formed in the same process. For example, in the case where the electro optical element 100 is formed of a semiconductor layer, the base member 190 is formed of the semiconductor layer forming the electro optical element 100. Alternatively, the base member 190 may be formed by patterning a layer formed of, for example, resin on the optical surface 180 of the electro optical element 100. In this case, for example, the base member 190 is formed of polyimide resin, acrylic resin, epoxy resin, or fluororesin.

The height of the base member 190 is determined according to the distance between the optical surface 180 and the end surface 120a of the optical fiber, and the shape and size of the connecting part 140 formed on the top surface 190a.

Furthermore, there is no restriction on the three-dimensional shape of the base member 190, although FIG. 1(A) and FIG. 1(B) show the case where the base member 190 is truncated cone-shaped. However, it is required that the base member has a structure where at least the connecting part is provided on the top surface. This can also be applied to any base members included in connection structures of other exemplary embodiments to be described later.

Figure 20A:
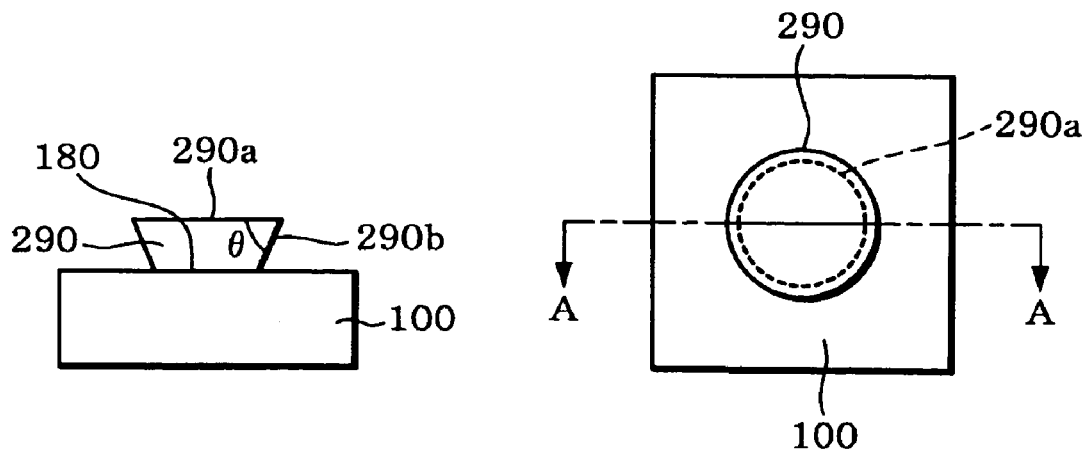
FIGS. 20(A) through 20(C) show modifications of the base member shown in FIG. 1(A) and FIG. 1(B)
Figure 20B:
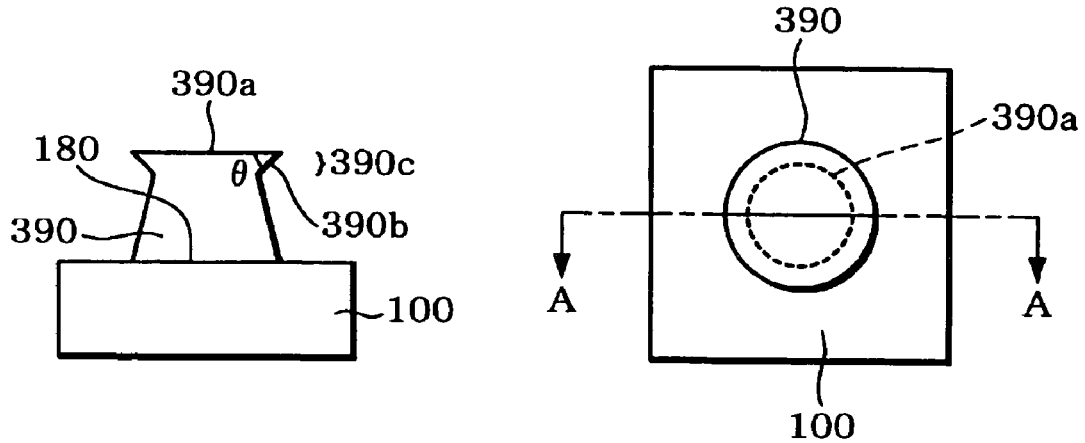
Figure 20C:
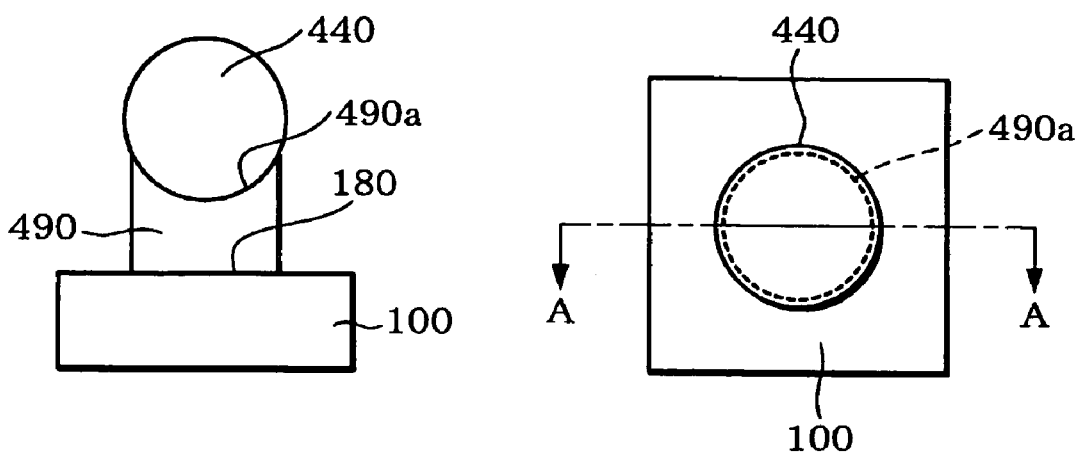

Examples of the shape of the base member are shown in FIGS. 20(A) through 20(C). In each of FIGS. 20(A) through 20(C), the right schematic shows a plan view of the electro optical element 100 including the base member, and the left schematic shows a sectional view along plane A—A of the right schematic.

(i) A base member 290 is provided on the electro optical element 100 shown in FIG. 20(A). In the base member 290, an angle θ formed by a top surface 290a and a side surface 290b of the base member 290 is an acute angle. Here, the side surface 290b of the base member 290 is a surface that intersects the top surface 290a at a side part of the base member 290. In the base member 290, a side part of the base member 290 is the side surface 290b of the base member 290.

The connecting member is formed by applying a liquid agent to the top surface 290a of the base member 290 to make a connecting part precursor (to be described later), and then by hardening the connecting part precursor. Therefore, since the angle θ formed by the top surface 290a and the side surface 290b of the base member 290 is an acute angle, it can be reduced or prevented the side surface 290b of the base member 290 from becoming wet with the liquid agent when the liquid agent is applied to the top surface 290a of the base member 290. As a result, the connecting part having the required shape and size can be certainly formed.

(ii) A base member 390 is provided on the electro optical element 100 shown in FIG. 20(B). In the base member 390, an upper part 390c of the base member 390 can be formed in a reverse taper manner. Also in this case, the angle θ formed by a top surface 390a and a side surface 390b (a surface that intersects the top surface 390a at a side part of the base member 390) of the base member 390 is an acute angle. With this structure, the angle θ formed by the top surface 390a and the side surface 390b of the base member 390 is reduced while keeping the stability of the base member 390. This can certainly reduce or prevent the side surface 390b of the base member 390 from becoming wet with the liquid agent. As a result, the connecting part having the required shape and size can be certainly formed.

(iii) A base member 490 is provided on the electro optical element 100 shown in FIG. 20(C). In the base member 490, a top surface 490a of the base member 490 is a curved surface. This enables a connecting part 440 that is almost spherical to be provided on the top surface 490a of the base member 490.

Example of Optical Element

Figure 19:
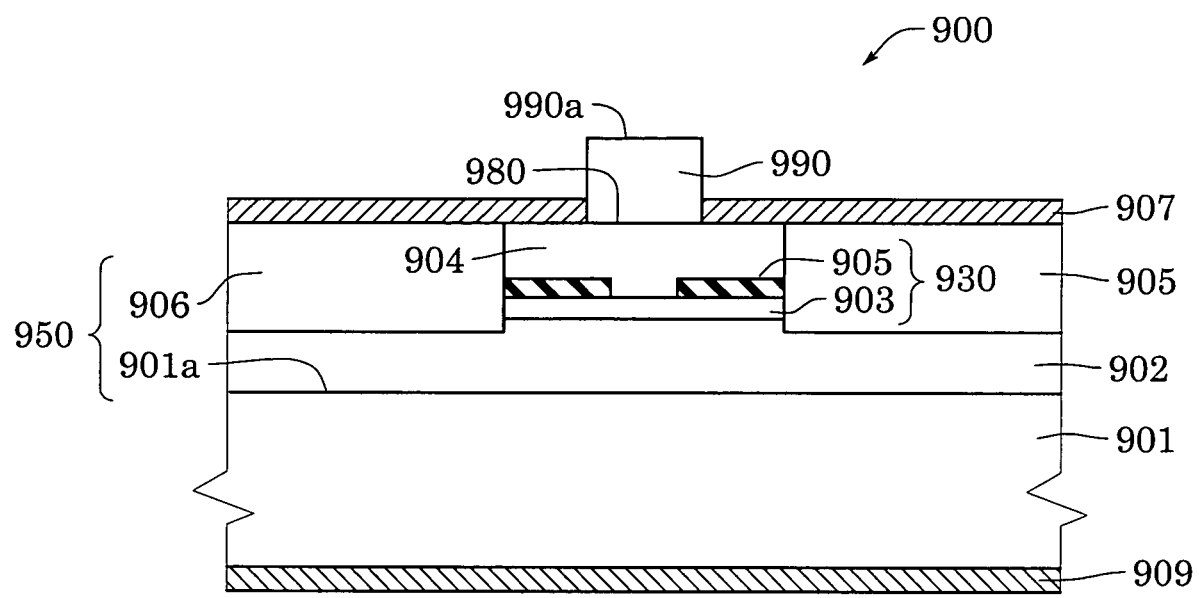
FIG. 19 shows an example of the optical element shown in FIG. 1(A) and FIG. 1(B)
Figure 19:
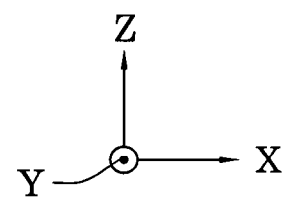

An example of the electro optical element 100 is shown in FIG. 19. In FIG. 19, the case where the electro optical element 100 is a surface emitting semiconductor laser 900 is shown.

As shown in FIG. 19, the surface emitting semiconductor laser 900 of the present exemplary embodiment includes a semiconductor substrate (a GaAs substrate in the present exemplary embodiment) 901 and a vertical resonator (hereinafter simply "resonator") 950 that is formed on the semiconductor substrate 901. The resonator 950 includes a semiconductor sediment (hereinafter "column section") 930 in the shape of a pillar.

The column section 930 is buried in an insulating layer 906. That is, the insulating layer 906 surrounds each side surface of the column section 930. In addition, a first electrode 907 is formed on top of the column section 930.

The resonator 950 is formed with a sediment structure in which a distributive reflection type multilayered mirror (hereinafter, "lower mirror") 902 formed by alternately depositing forty (40) pairs of n-type $Al_{0.9}Ga_{0.1}As$ layer and n-type $Al_{0.15}Ga_{0.85}As$ layer, an active layer 903 that is composed of a GaAs well layer and an $Al_{0.3}Ga_{0.7}As$ barrier layer and includes a quantum well structure composed of triple well layers, and a distributive reflection type multilayered mirror (hereinafter, "upper mirror") 904 formed by alternately depositing twenty five (25) pairs of alternately p-type $Al_{0.9}Ga_{0.1}As$ layer and p-type $Al_{0.15}Ga_{0.85}As$ layer are deposited in that order. Furthermore, the compositions and the numbers of the lower mirror 902, the active layer 903, and the upper mirror 904 are not limited to this example.

The upper mirror 904 is made p-type by doping with carbon, for example, and the lower mirror 902 is made n-type by doping with silicon, for example. Accordingly, a pin diode is formed by the upper mirror 904, the active layer 903 that is not doped with an impurity, and the lower mirror 902.

In addition, the column section 930 is formed in a part of the resonator 950 from a laser light emission side of the surface emitting semiconductor laser 900 to a point inside the lower mirror 902 by etching from the laser light emission side in the shape of a circle. Furthermore, although the planar shape of the column section 930 is circular in the present exemplary embodiment, it is possible for this shape to be any freely chosen shape.

In addition, a current aperture 905 made of aluminum oxide is formed in regions close to the active layer 903 in the portion that forms the upper mirror 904. The current aperture 905 is formed in the shape of a ring. That is, the edges of the current aperture 905 taken in a plane parallel with the X-Y plane shown in FIG. 19 are in the form of concentric circles.

Also, in the surface emitting semiconductor laser 900 according to the present exemplary embodiment, the insulating layer 906 is formed so as to cover the side surface of the column section 930 and the upper surface of the lower mirror 902.

In the manufacturing process of the surface emitting semiconductor laser 900, after the insulating layer 906 that covers the side surface of the column section 930 has been formed, the first electrode 907 is formed on the upper surface of the column section 930 and the upper surface of the insulating layer 906 and a second electrode 909 is formed on a rear surface (a surface on the opposite side of the semiconductor substrate 901 to the surface which the resonator 950 is provided) of the semiconductor substrate 901. When forming such electrodes, it is common to perform an annealing process at around 400° C. (see the manufacturing process described later). Accordingly, when the insulating layer 906 is formed using resin, in order to withstand this annealing process, the resin that composes the insulating layer 906 needs to have superior resistance to heat. In order to satisfy this demand, it is preferable for polyimide resin, fluororesin, acrylic resin, epoxy resin, or the like to be used as the resin that composes the insulating layer 906, and in view of the ease of manufacturing and insulating properties, polyimide resin or fluororesin is especially preferable. In addition, in cases where an optical member (such as a lens) that has resin as a raw material is formed on the insulating layer 906, to increase the contact angle with the lens material (resin) and make it easy to control the lens shape, it is preferable for the insulating layer 906 to be made of polyimide resin or fluororesin. In this case, the insulating layer 906 is formed by hardening a resin precursor through irradiation with energy, such as heat or light or through a chemical function.

The first electrode 907 is also formed on the column section 930 and the insulating layer 906. Additionally, a part (opening) where the first electrode 907 is not formed is provided in the center of the upper surface of the column section 930. This part is the optical surface 980. The optical surface 980 is an emission opening for laser light. The first electrode 907 is formed of multilayered films of an alloy of gold with zinc and gold, for example.

In addition, the second electrode 909 is formed on the rear surface of the semiconductor substrate 901. That is, in the surface emitting semiconductor laser 900 shown in FIG. 19, the first electrode 907 is joined onto the column section 930 and the second electrode 909 is joined onto the rear surface of the semiconductor substrate 901, with a current being injected into the active layer 903 by the first electrode 907 and the second electrode 909. The second electrode 909 is formed of multilayered films of an alloy of gold with germanium and gold, for example.

The materials for forming the first electrode 907 and the second electrode 909 are not limited to those mentioned above, and for example it is possible to use metals, such as titanium and platinum and alloys of such.

The connecting part 140 is formed on an upper surface 990a of the base member 990, and the connecting part 140 is coupled to the end surface 120a of the optical fiber 120, although not shown in FIG. 19.

The following describes the standard operation of the surface emitting semiconductor laser 900 according to the present exemplary embodiment. The driving method of the surface emitting semiconductor laser described below is only one example, and a variety of modifications are possible without departing from the gist of the present invention.

First, when a voltage is applied in the forward direction to the pin diode at the first electrode 907 and the second electrode 909, electrons are recombined with holes in the active layer 903, with such recombining resulting in the emission of light. When the light generated there reciprocally moves between the upper mirror 904 and the lower mirror 902, induced emission occurs, which amplifies the intensity of the light. When the light gain exceeds the light loss, laser oscillation occurs, and laser light is emitted from optical surface 980 that is on the upper surface of the column section 930 and then enters the base member 990. The laser light that enters the base member is emitted in a perpendicular direction with respect to the semiconductor substrate 901. Here, the expression "a perpendicular direction with respect to the semiconductor substrate 901" refers to a direction (the direction Z in FIG. 19) that is perpendicular to the surface 901a (a plane that is parallel with the X-Y plane in FIG. 19) of the semiconductor substrate 901.

Optical Fiber

The optical fiber 120 generally includes a core 122 and a clad 124. The clad 124 surround the core 122 concentrically. In the optical fiber 120, light is reflected at a boundary between the core 122 and the clad 124 so that the light is confined in the core 122 to get transmitted inside the core 122. Meanwhile, the clad 124 is covered and protected by a jacket (not illustrated in the figure).

Though this exemplary embodiment shows an example where the optical fiber 120 has a sectional shape of a circle, there is no specific restriction on the sectional shape of the optical fiber 120. This can also be applied to any of the optical fibers shown in other exemplary embodiments, as well as modifications to be described later. For example, the optical fiber 120 can be an optical fiber having a sectional shape of an oval, or even another optical fiber, which has a sectional core shape of a circle or oval with a sectional clad of any shape.

FIG. 1(A) shows an end part of the optical fiber 120 (one of the two end parts). It is still possible that each of both the end parts of the optical fiber 120 is equipped with the electro optical element 100 through the connecting part 140 and the base member 190. In this case, the electro optical element 100 placed at one end part is a light emitting element and placed at another is a light receiving element. Otherwise, it is also possible that only one of the two end parts of the optical fiber 120 is equipped with the electro optical element 100 through the connecting part 140 and the base member 190. This notice can also be applied to any connection structures of optical elements and optical fibers shown in other exemplary embodiments as well as modifications to be described later.

Connecting Part

As FIG. 1(A) shows, the connecting part 140 is coupled to the end surface 120a of the optical fiber 120, and the top surface 190a of the base member 190.

When the electro optical element 100 is a light receiving element (not illustrated in the figure) for example, the light emitted from the optical fiber 120 is let into the light receiving element. At this time, the light emitted from the end surface 120a of the optical fiber 120 is let into the light receiving element after going through the connecting part 140 and the base member 190. Otherwise, when the electro optical element 100 is a light emitting element (not illustrated in the figure) for example, the light emitted from the light emitting element is let into the end surface 120a of the optical fiber 120. At this time, the light emitted from the light emitting element is let into the end surface 120a of the optical fiber 120 after going through the base member 190 and the connecting part 140.

The connecting part 140 is formed by hardening a liquid material that is hardened by charging energy. As the liquid material, for example, a precursor of an ultraviolet curable resin material or a thermosetting resin material can be used. As the ultraviolet curable resin material, for example, acrylic base resin and epoxy base resin of an ultraviolet curing type is listed. As the thermosetting cure resin material, polyimide base resin of a thermosetting cure type can be named.

A precursor of an ultraviolet cure resin material gets hardened by applying ultraviolet rays for a short time. Therefore, hardening can be done without going through any process which is likely to cause damage to an element, such as a thermal treatment process. Consequently, forming the connecting part 140 with a precursor of an ultraviolet cure resin material can reduce the chance of any adverse effects on the element.

Concretely to describe, the connecting part 140 can be formed by applying a liquid agent to either or both of the end surface 120a of the optical fiber 120 and the top surface 190a of the base member 190 to make a connecting part precursor (to be described later), and then by hardening the connecting part precursor.

More concretely to describe, the connecting part 140 is composed of a precursor of an ultraviolet curable resin material or a thermosetting curable resin material. In this case, the shape and size of the connecting part 140 can be controlled by adjusting the type and volume of the liquid agent to be used to form the connecting part 140.

The shape and size of the connecting part 140 is determined according to the distance between the end surface 120a of the optical fiber 120 and the optical surface 180 of the electro optical element 100, while taking into consideration the thickness of the base member 190. Namely, depending on the distance between the end surface 120a of the optical fiber 120 and the top surface 190a of the base member 190, the shape and size of the connecting part 140 is determined so as to join the end surface 120a of the optical fiber 120 and the top surface 190a of the base member 190. This notice is also applied to any other exemplary embodiments as well as modifications to be described later.

The refractive index of the connecting part 140 is greater than the refractive index of the clad 124 of the optical fiber 120. With this structure, it becomes possible to reduce the chance of the light breaking into the clad 124.

Furthermore, the refractive index of the connecting part 140 is almost equal to the refractive index of the core 122 of the optical fiber 120. With this structure, the light reflection at the boundary between the connecting part 140 and the core 122 can be decreased so that the optical loss at the boundary can be reduced. In this case, the refractive index of the base member 190 is almost equal to the refractive index of the connecting part 140. In this case, since the refractive indexes of the connecting part 140, the base member 190, and the core 122 are almost equal, the reflection of light at each interface of these elements can be reduced. As a result, the optical loss of light at each interface can be reduced. This relationship of the refractive indexes is also applied to any other exemplary embodiments as well as modifications to be described later.

2. Connection Method to Couple Optical Element and Optical Fiber

A method of manufacturing the connection unit 1000 shown in FIG. 1(A) will now be described by referring to FIG. 2 and FIG. 3. Each of FIG. 2 through FIG. 4 schematically illustrate each single step of the connection method to couple the electro optical element 100 and the optical fiber 150.

First, the base member 190 is formed on the optical surface 180 of the electro optical element 100 as shown in FIG. 1(B). The base member 190 can be formed by using the above-described methods for example.

Forming Connecting Part Precursor

Figure 2:
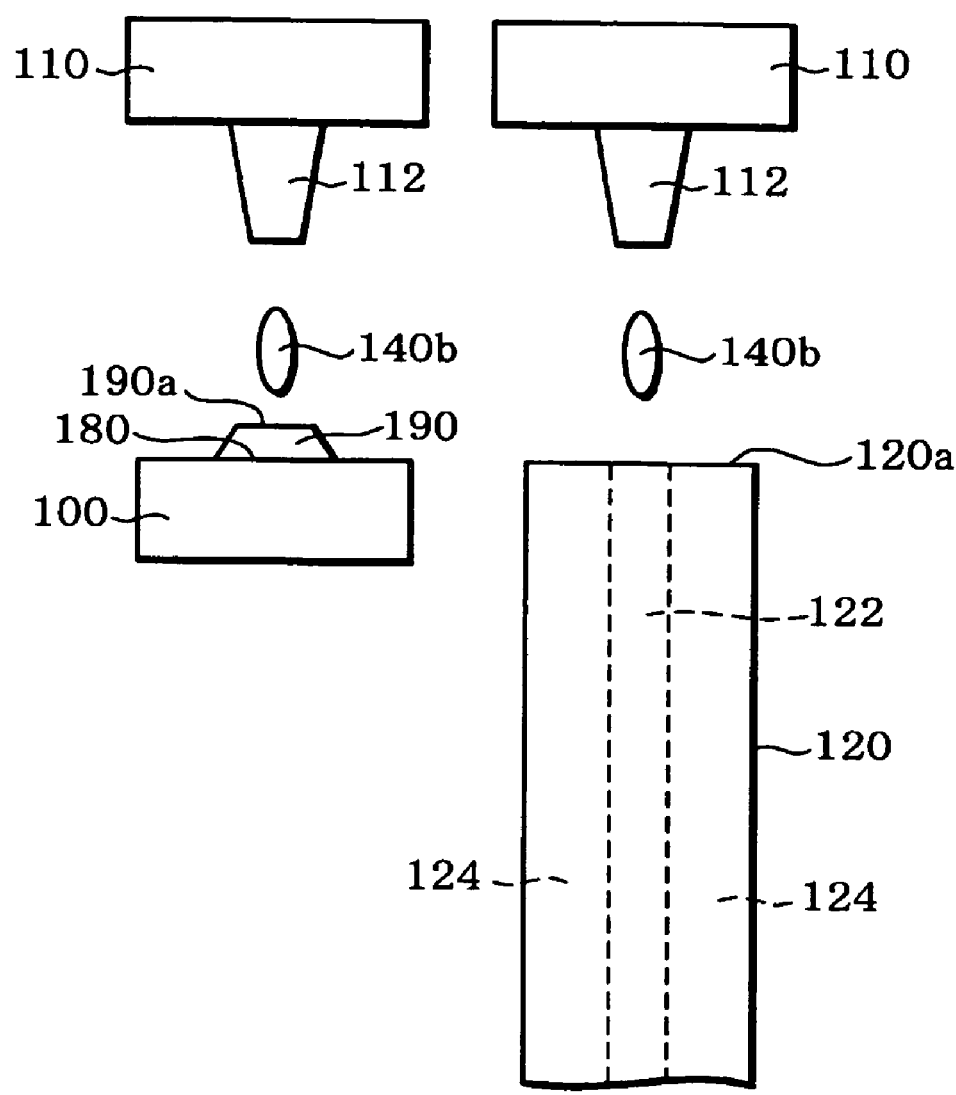
FIG. 2 shows a process of a connection method to couple an optical element and an optical fiber according to the first exemplary embodiment of the invention.
Figure 3:
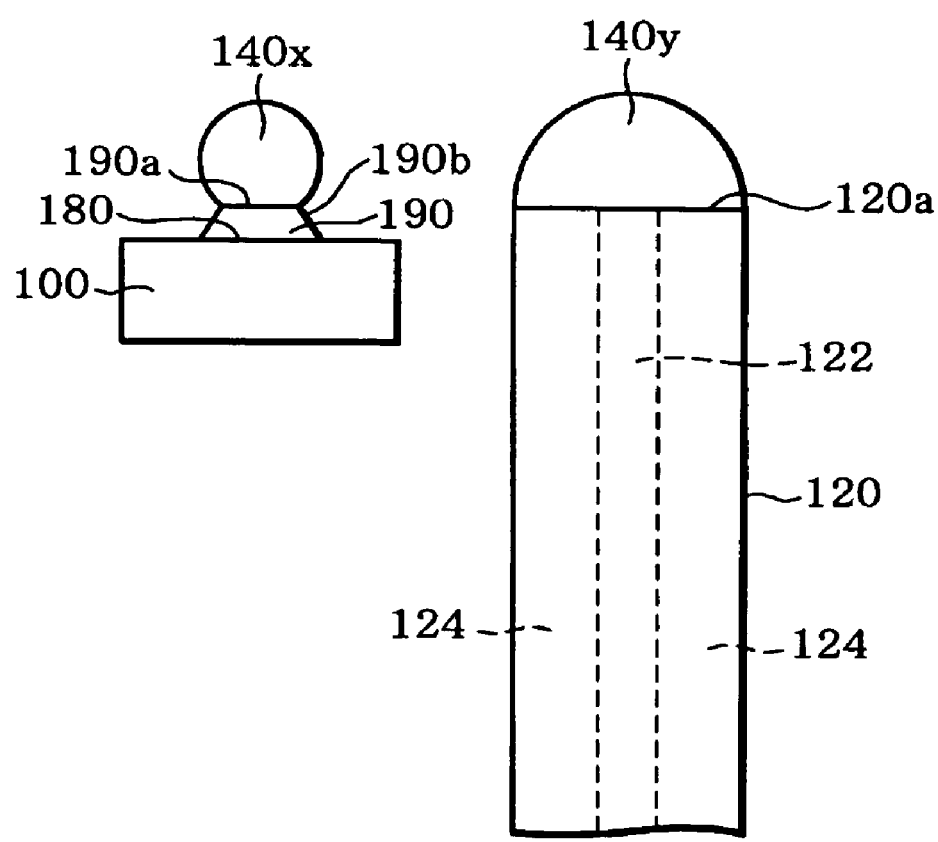
FIG. 3 shows a process of a connection method to couple an optical element and an optical fiber according to the first exemplary embodiment of the invention.
Figure 4:
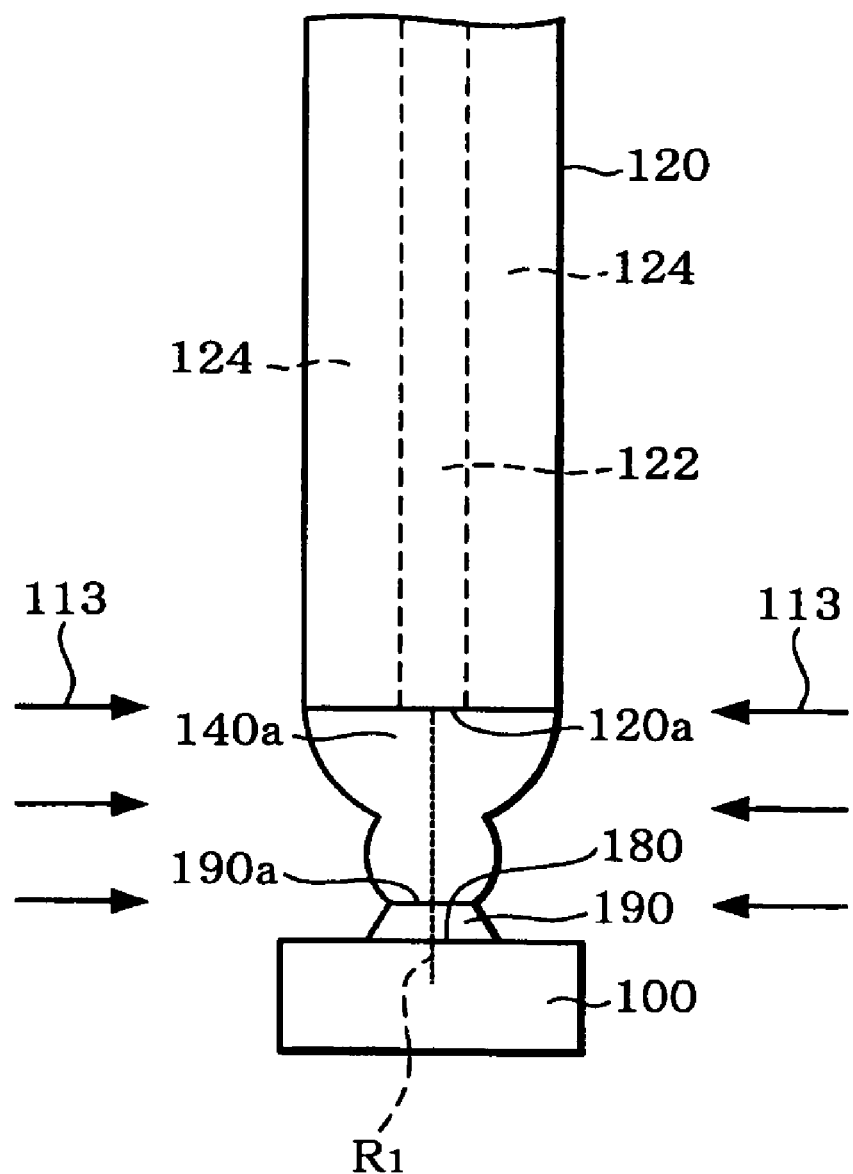
FIG. 4 shows a process of a connection method to couple an optical element and an optical fiber according to the first exemplary embodiment of the invention.

Next, a connecting part precursor 140a is formed on the end surface 120a of the optical fiber 120 and the top surface 190a of the base member 190 (Refer to FIG. 2 and FIG. 3). Concretely to describe, a drop of the liquid material (hereinafter called a "droplet" 140b) to form the connecting part 140 is dispensed onto, either or both of the end surface 120a of the optical fiber 120 and the top surface 190a of the base member 190 so as to form the connecting part precursor 140a. As described above, the liquid material is hardened by charging energy.

This exemplary embodiment describes an example where, as shown in FIG. 2, the droplet 140b is dispensed onto both the end surface 120a of the optical fiber 120 and the top surface 190a of the base member 190 to form connecting part precursors 140x and 140y. As in a second exemplary embodiment to be described later, it is still possible to dispense the droplet 140b onto either of the end surface 120a of the optical fiber 120 or the top surface 190a of the base member 190 to form a connecting part precursor and then face the end surface 120a and the top surface 190a of the base member 190 each other to form the connecting part precursor 140a (to be described later, refer to FIG. 4).

As a way of dispensing the droplet 140b, for example, a dispenser method or an ink-jet method is named. The dispenser method is an ordinary way to dispense the droplet 140b, and it is effective to dispense the droplet 140b in a relatively wide area.

The ink-jet method is a way to dispense a droplet by using an ink-jet head. Using this method makes it possible to control a position to which the drop is dispensed at the micrometer level and to control the volume of the drop to be dispensed at the picoliter level. As a result, it becomes possible to manufacture a connecting part of a fine structure on an end surface of an optical fiber that is minute in size.

A way of dispensing the droplet 140b by using an ink-jet head 110 will now be described by referring to FIG. 2. The droplet 140b is dispensed onto the end surface 120a of the optical fiber 120 and the top surface 190a of the base member 190 by using the ink-jet head 110 as FIG. 2 shows. As a result, the connecting part precursor 140x is formed on the end surface 120a of the optical fiber 120, while the connecting part precursor 140y is formed on the top surface 190a of the base member 190 as FIG. 3 shows.

As ways of ink-jet dispensing, for example, there are two methods as described below:

(i) The size of a bubble in the liquid (in this case, it is the connecting part precursor) gets changed by heat to cause pressure, which eventually dispenses the liquid.

(ii) A piezoelectric element is used to cause pressure, which eventually dispenses the liquid.

In order to effectively control liquid pressure, the method (ii) is preferable.

A related art image recognition technology which is commonly used in an exposure and an inspection work step of semiconductor IC circuit manufacturing processes is applied for alignment work to control the position of an ink-jet head nozzle and the position to which a droplet is dispensed. For example, the alignment is done between the positions of a nozzle 112 of the ink-jet head 120 and the top surface 190a of the base member 190, and the nozzle 112 and the end surface 120a of the optical fiber 120. After the alignment, the voltage to be imposed onto each ink-jet head is adjusted and then the droplet 140b is dispensed. As a result of the above operation, the connecting part precursors 140x and 140y are formed on the top surface 190a of the base member 190 and the end surface 120a of the optical fiber 120, respectively, as FIG. 3 shows.

Here, dispensing the droplet 140b is repeated as many times as needed, to form the connecting part precursors 140x and 140y of the required shape and size. The connecting part precursors 140x and 140y are so shaped and sized that at least some parts of them meet each other to get joined when the end surface 120a of the optical fiber 120 and the optical surface 180 are set to have a predetermined distance, and the thickness of the base member 190 is set to a predetermined value.

If needed, lyophilic or lyophobic treatment is done for the end surface 120a of the optical fiber 120 and the top surface 190a of the base member 190 before dispensing the droplet 140b. This makes it possible to control the wettability of the end surface 120a and the top surface 190a of the base member 190 for the droplet 140b. This operation enables controlling the shape and size of the connecting part 140 more precisely.

Next, the end surface 120a of the optical fiber 120 and the top surface 190a of the base member 190 are faced each other. In this exemplary embodiment, at least a part of the end surface 120a is faced to the top surface 190a of the base member 190. In terms of efficient utilization of light, it is desirable to place the optical fiber 120 and the electro optical element 100 so, as shown in FIG. 4, the center of the optical surface 180 is positioned on a line $R_1$ that comes through the center of the end surface 120a and is perpendicular to the end surface 120a.

Furthermore, the end surface 120a of the optical fiber 120 and the top surface 190a of the base member 190 are closely placed to have a predetermined distance between them, and thereby the connecting part precursors 140x and 140y (Refer to FIG. 3) get contacted each other. According to this operation, the connecting part precursors 140x and 140y, both of which are liquid, are merged into the connecting part precursor 140a (Refer to FIG. 4). The connecting part precursor 140a obtained in this step is joined to the end surface 120a and the top surface 190a of the base member 190 as shown in FIG. 4.

Forming Connecting Part

Next, the connecting part precursor 140a is hardened to form the connecting part 140, as FIG. 4 shows. Concretely to describe, some energy 113, such as thermal energy, and optical energy is applied to the connecting part precursor 140a.

For hardening the connecting part precursor 140a, an appropriate hardening method is to be selected depending on the type of the liquid material. Concretely to describe, charging thermal energy and radiating ultraviolet rays, laser beams and so on can be named as a hardening method. The amount of energy 113 to be charged is adjusted as required, depending on the shape, size and material of the connecting part precursor 140a. Through the manufacturing steps described above, the connection unit 1000 including the electro optical element 100, the optical fiber 120, and the connecting part 140 is finally materialized (Refer to FIG. 1).

3. Operation and Effects

By applying the connection structure and the connection method to couple an optical element and an optical fiber according to this exemplary embodiment, it becomes possible to obtain a connection structure (the connection unit 1000) that inexpensively secure optical transmission between the electro optical element 100 and the optical fiber 120.

Furthermore, applying the connection method to couple an optical element and an optical fiber according to this exemplary embodiment achieves high productivity and also makes it unnecessary to implement any accurate alignment between the electro optical element 100 and the optical fiber 120. The operation and effects described above are explained in detail below.

(1) First, since the end surface 120a of the optical fiber 120 and the top surface 190a of the base member 190 are coupled through the connecting part 140, the optical loss of the light transmitted between the optical fiber 120 and electro optical element 100 can be reduced. To explain the reason for the above, an ordinary connecting structure between an optical element and an optical fiber is described below.

In the case of an ordinary connecting structure between an optical element and an optical fiber, no connecting part is formed between the optical element and the optical fiber. Therefore, for the purpose of efficiently letting the light emitted from the optical element (or optical fiber) into the optical fiber (or optical element), it is needed to precisely perform alignment between the optical element and the optical fiber. In addition, if the optical element is a light emitting element, sometimes the light emitted from the optical surface is once reflected on the end surface of the optical fiber and then enters the optical surface. Then, there arises a problem that the incident light (returning light) changes properties of the optical element.

Meanwhile, in the case of the connection structure, according to this exemplary embodiment (the connection unit 1000), the connecting part 140 is joined between the optical fiber 120 and the base member 190. Therefore, even without any precise alignment between the electro optical element 100 and the optical fiber 120, the light emitted from the electro optical element 100 (or the optical fiber 120) can be efficiently introduced into the optical fiber 120 (or the electro optical element 100). Namely, by applying this connection unit 1000, it becomes possible even without any precise alignment to secure optical transmission between the electro optical element 100 and the optical fiber 120.

Furthermore, since the end surface 120a of the optical fiber 120 and the top surface 190a of the base member 190 are joined through the connecting part 140, it is possible to reduce or prevent the above-mentioned returning light from emerging. This enables the electro optical element 100 to maintain its properties as they are.

Figure 17B:
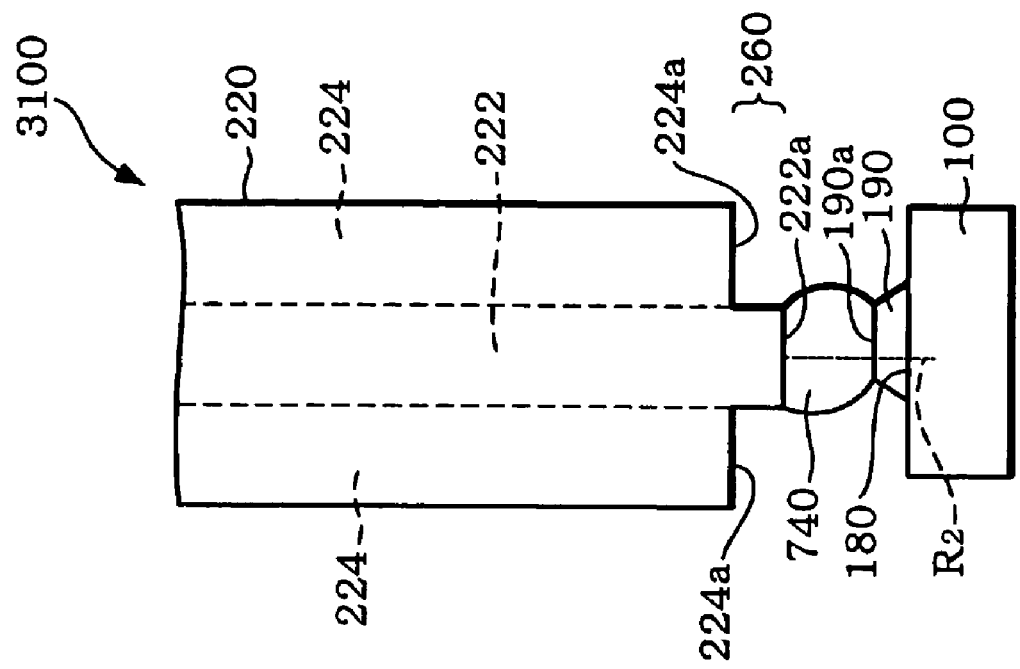
FIG. 17(B) shows a modification of a connection structure between an optical element and an optical fiber according to the second exemplary embodiment of the invention.
Figure 17A:
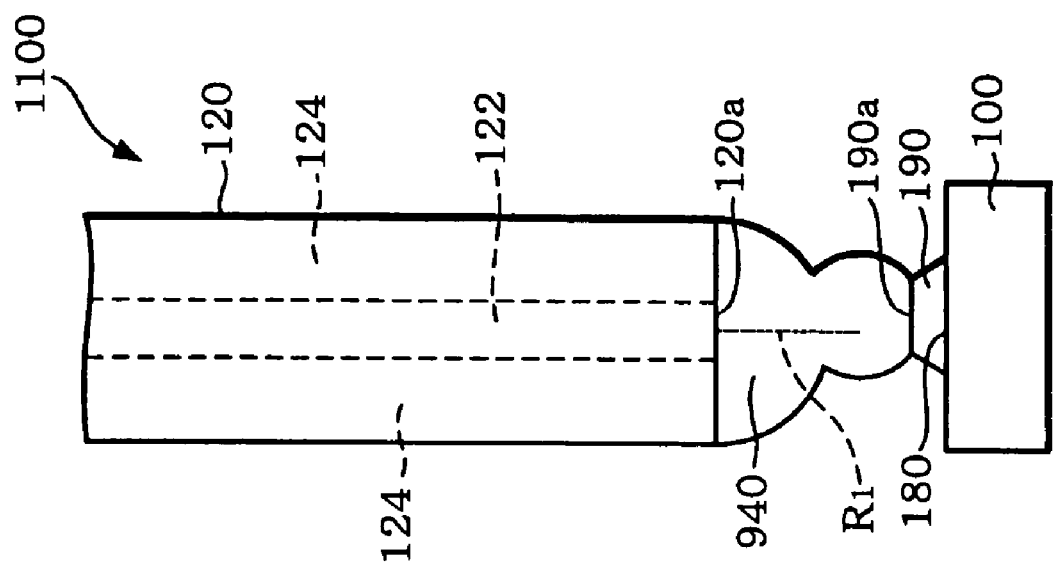
FIG. 17(A) shows a modification of a connection structure between an optical element and an optical fiber according to the first exemplary embodiment.

A modification is shown in FIG. 17(A) (a connection unit 1100). Even if the center of the optical surface 180 is not positioned on the line $R_1$ that comes through the center of the end surface 120a of the optical fiber 120 and is perpendicular to the end surface 120a, it is still possible to efficiently transmit light since the end surface 120a and the top surface 190a of the base member 190 are joined through a connecting part 940.

Another modification is shown in FIG. 17(B) (a connection unit 3100). Even if the center of the top surface 190a of the base member 190 is not positioned on a line $R_2$ that comes through the center of an end surface 222a of a core 222 and is perpendicular to the end surface 222a, it is still possible to efficiently transmit light since the end surface 222a and the top surface 190a of the base member 190 are joined through a connecting part 740.

In FIG. 17(A) and FIG. 17(B), the connecting parts 740 and 940 are made of the same material as that of the connecting part 140 described in this exemplary embodiment, and they are formed by the same method as this exemplary embodiment explains.

(2) Second, the connecting part 140 is formed by hardening a liquid material that is hardened by charging energy. In other words, a connecting part precursor is formed on either of the end surface 120a of the optical fiber 120 or the top surface 190a of the base member 190. Then, while contacting with the end surface 120a and the top surface 190a of the base member 190, the connecting part precursor is hardened. As a result, the electro optical element 100 and the optical fiber 120 are joined through the connecting part 140 and the base member 190. Accordingly, it is not required to implement any accurate alignment between the electro optical element 100 and the optical fiber 120.

The shape and size of the connecting part precursor 140a is controlled by adjusting the dispensing volume of the droplet 140b. Therefore, the shape and size of the connecting part precursor 140a can be adjusted according to the distance between the electro optical element 100 and the optical fiber 120.

(3) Third, the connecting part 140 is provided on the top surface 190a of the base member 190, and thereby the shape and size of the connecting part 140 can be more precisely controlled. In order to form the connecting part 140, the connecting part precursor 140a is formed on the top surface 190a of the base member 190 (Refer to FIG. 3) as previously described. Here, as long as the side surface 190b of the base member 190 does not get wet with a liquid material forming the connecting part precursor 140a, the surface tension of the base member 190 does not act on the connecting part precursor 140a. Instead, mainly the surface tension of the liquid material acts on the connecting part precursor 140a. Therefore, the shape of the connecting part precursor 140a can be controlled by controlling the volume of the liquid material (the droplet 140b) used to form the connecting part 140. This enables the connecting part 140 with more precisely controlled shape and size to be formed. As a result, the shape and size of the connecting part 140 can be adjusted depending on the distance between the end surface 120a of the optical fiber 120 and the top surface 190a of the base member 190. Thus, by the connecting part 140, the end surface 120a of the optical fiber 120 and the top surface 190a of the base member 190 can be certainly joined.

Furthermore, the position where the connecting part precursors 140x and 140y are provided can be precisely controlled (Refer to FIG. 4). It is difficult to precisely control the position where a dispensed droplet lands generally. On the other hand, according to the above method, the connecting part precursors 140x and 140y can be formed on the top surface 190a of the base member 190 and the end surface 120a of the optical fiber 120, respectively, without implementing alignment. Namely, the connecting part precursor can be formed without implementing alignment by simply dispensing the droplet 140b onto, either or both of the end surface 120a of the optical fiber 120 and the top surface 190a of the base member 190. In other words, the connecting part precursor can be formed with the same alignment accuracy as that of forming the base member 190.

In particular, when the droplet 140b is dispensed by using an ink-jet method, the droplet 140b can be dispensed onto more precise position. Therefore, the position where the connecting part precursor is provided can be controlled. In addition, the volume of the droplet 140b to be dispensed can be controlled at the picoliter level by dispensing the droplet 140b using an ink-jet method. Therefore, a fine structure can be made precisely.

(4) Fourth, the shape and size of the connecting part 140 can be set by setting the shape and area of the top surface 190a of the base member 190.

Second Exemplary Embodiment

1. Connection Structure between Optical Element and Optical Fiber

Figure 5:
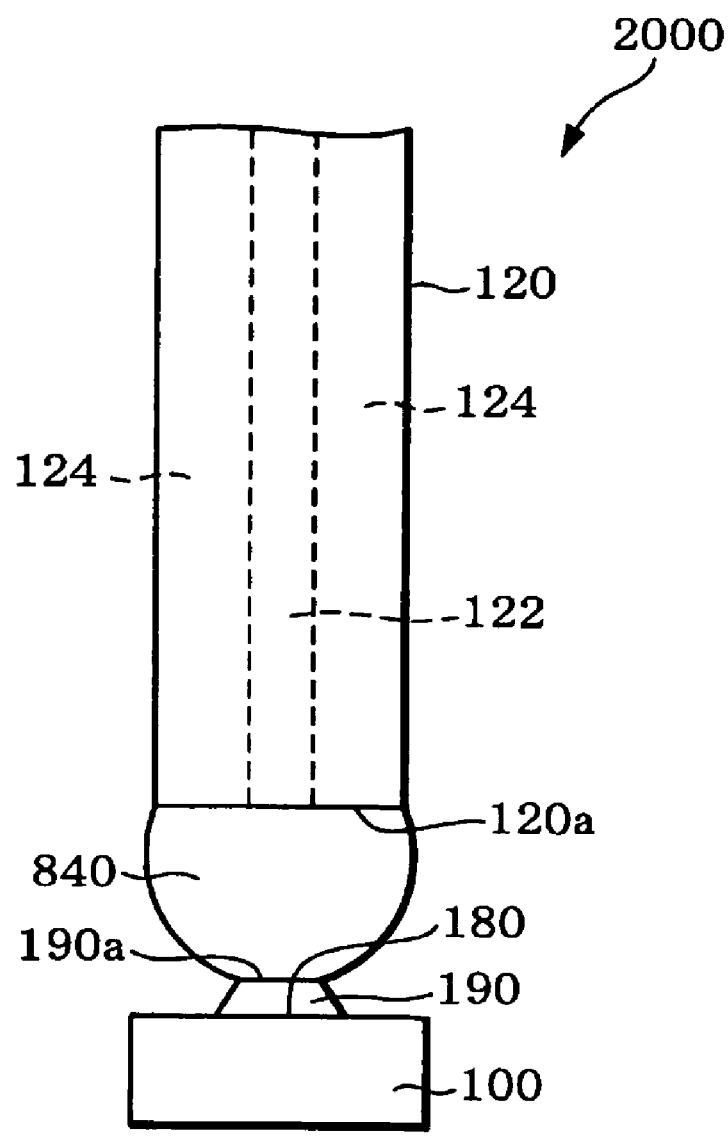
FIG. 5 shows a side view of a connection structure between an optical element and an optical fiber according to a second exemplary embodiment of the invention.

FIG. 5 shows a side view of a connection structure between an optical element and an optical fiber according to a second exemplary embodiment of the present invention. A connection unit 2000 is shown in FIG. 5 as the connection structure.

The connection unit 2000 includes the electro optical element 100, the optical fiber 120, and a connecting part 840, as shown in FIG. 5.

In the connection unit 2000, the way of forming the connecting part 840 is different from that of the connecting part 140 (Refer to FIG. 1(A)) described in the first exemplary embodiment. The other structural components other than this point are the same as those of the connection unit 1000 of the first exemplary embodiment.

Therefore, as a general rule in the description on this connection unit 2000, any component having the same structure as the corresponding component in the connection unit 1000 of the first exemplary embodiment is provided with the same numeral as given in the connection unit 1000, and any detailed description for the component is omitted.

2. Connection Method to Couple Optical Element and Optical Fiber

Figure 6:
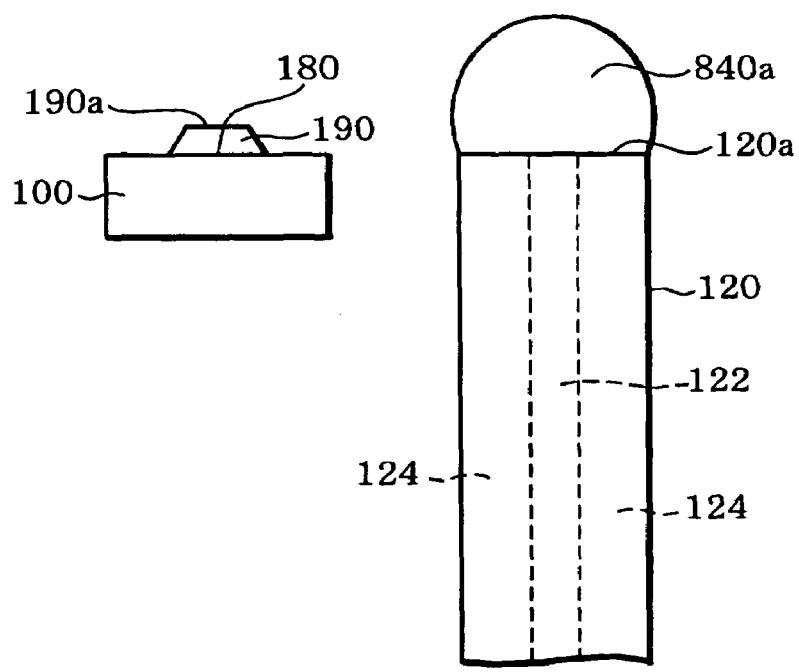
FIG. 6 shows a process of a connection method to couple an optical element and an optical fiber according to the second exemplary embodiment of the invention.
Figure 7:
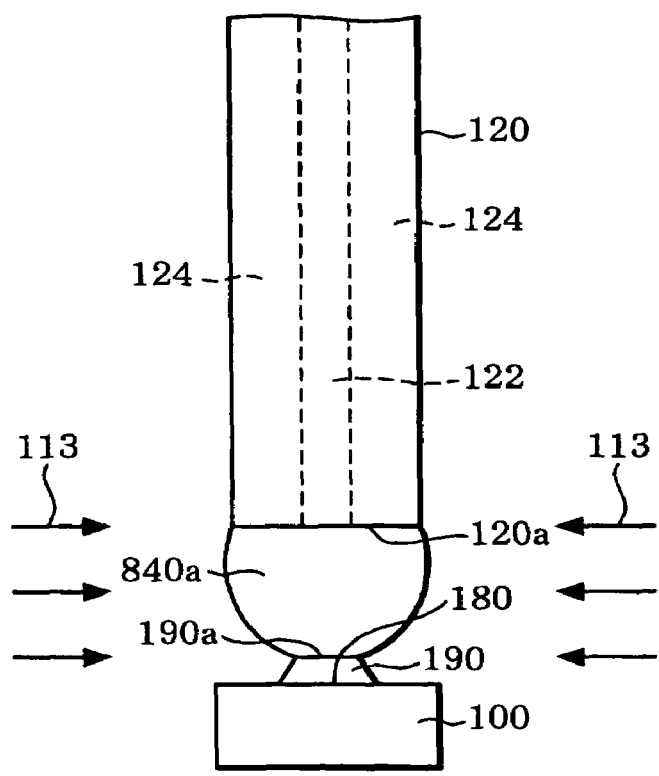
FIG. 7 shows a process of a connection method to couple an optical element and an optical fiber according to the second exemplary embodiment of the invention.

Next, a method of manufacturing the connection unit 2000 shown in FIG. 5 is described by referring to FIG. 6 and FIG. 7. For any process, which is the same as the connection method to couple the electro optical element 100 and the optical fiber 120 of the first exemplary embodiment described above, the relevant description is omitted as a general rule.

Forming Connecting Part Precursor

This exemplary embodiment describes an example where, as shown in FIG. 6, a connecting part precursor 840a is formed only on the end surface 120a of the optical fiber 120. A forming method of the connecting part precursor 840a is the same as described in the first exemplary embodiment for the connecting part precursors 140x and 140y. Namely, the connecting part precursor 840a is formed on the end surface 120a by dispensing the droplet 140b (Refer to FIG. 2) onto the end surface 120a of the optical fiber 120 (Refer to FIG. 6).

Forming Connecting Part

A forming method of the connecting part 840 (Refer to FIG. 5) is the same as described in the first exemplary embodiment. Furthermore, the connecting part 840 can be made of the same material as that of the connecting part 140 described in the first exemplary embodiment.

Specifically, while the end surface 120a of the optical fiber 120 and the top surface 190a of the base member 190 are kept to face each other, as shown in FIG. 7, the end surface 120a of the optical fiber 120 and the top surface 190a of the base member 190 are closely placed to have a predetermined distance between them, and then the connecting part precursor 840a gets contacted with the top surface 190a of the base member 190. Then, the energy 113 is applied to the connecting part precursor 840a to harden the connecting part precursor 840a. On this occasion, the connecting part precursor 840a is joined to the optical surface 180.

As a result, the connecting part 840 is formed as FIG. 5 shows.

Others

This exemplary embodiment describes an example where the connecting part 840 is formed by the process in which the connecting part precursor 840a is formed only on the end surface 120a of the optical fiber 120. Alternatively, it is also possible to place a connecting part precursor only on the optical surface 180 to form the connecting part (not shown in the accompanying figures). In this case, the connecting part precursor gets touched with at least the end surface of the core on the end surface 120a when the connecting part precursor gets touched with the end surface 120a.

3. Operation and Effects

Applying the connection structure and the connection method to couple an optical element and an optical fiber of this exemplary embodiment brings the same operation and effects of the connection structure and the connection method of the first exemplary embodiment.

Moreover, by applying the connection structure and the connection method to couple an optical element and an optical fiber of this exemplary embodiment, the connecting part is formed by the process where a connecting part precursor is formed onto at least one of the end surface 120a of the optical fiber 120 and the top surface 190a of the base member 190. Thus, the connecting part can be obtained by an easier method.

In particular, when the connecting part precursor 840a is formed on the end surface 120a of the optical fiber 120, surface tension generally acts on the connecting part precursor 840a as far as the side of the optical fiber 120 does not get wet with the connecting part precursor 840a. Therefore, the shape and size of the connecting part precursor 840a can be controlled by adjusting the volume of the liquid agent by which the connecting part precursor 840a is formed. As a result, the connecting part 840 can be formed, having the required shape and size.

In addition, when the connecting part 840 is formed, the connecting part precursor 840a may get contacted with the top surface 190a of the base member 190. Therefore, by forming the base member 190 with the top surface 190a having an appropriate size, the margin for alignment can be broaden when the end surface 120a of the optical fiber 120 and the top surface 190a of the base member 190 are joined through the connecting part 840.

Third Exemplary Embodiment

1. Connection Structure between Optical Element and Optical Fiber

Figure 8:
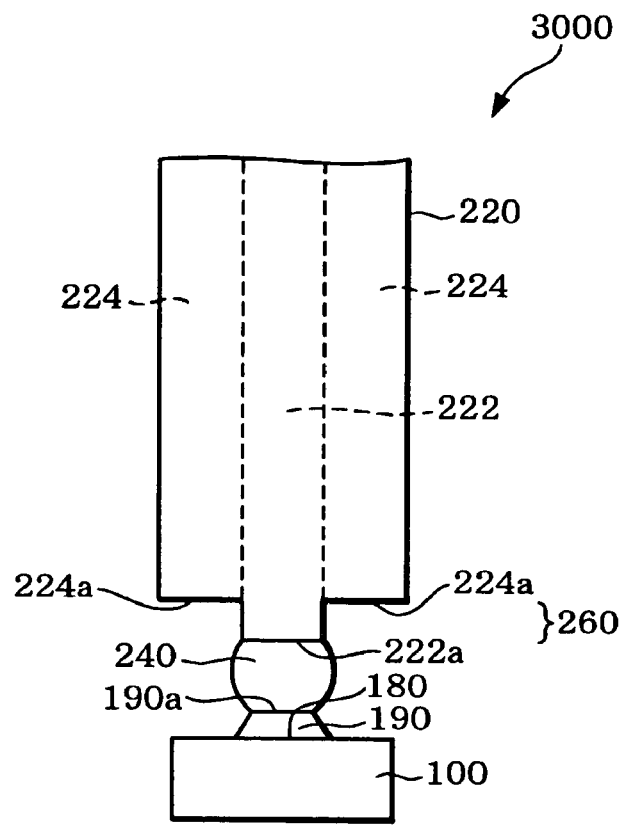
FIG. 8 shows a side view of a connection structure between an optical element and an optical fiber according to a third exemplary embodiment of the invention.

FIG. 8 shows a side view of a connection structure between an optical element and an optical fiber according to a third exemplary embodiment of the present invention. A connection unit 3000 is shown in FIG. 8 as the connection structure.

The connection unit 3000 of this exemplary embodiment includes the electro optical element 100, an optical fiber 220, and a connecting part 240 as shown in FIG. 8.

The connection unit 3000 shown in FIG. 8 has a different structure from the structures of the first and second exemplary embodiments in a point that the height of an end surface 222a of a core 222 is different from that of an end surface 224a of a clad 224 at an end part of the optical fiber 220, while the end surface 222a and the top surface 190a of the base member 190 are joined through the connecting part 240.

Each component of the connection unit 3000 will now be described. As a general rule in the description on this connection unit 3000, any component having the same structure as the corresponding component in the connection unit 1000 of the first exemplary embodiment is provided with the same numeral as given in the connection unit 1000, and any detailed description for the component is omitted.

Optical Fiber

The optical fiber 220 includes the core 222 and the clad 224. This exemplary embodiment shows an example where the core 222 is not covered by the clad 224 at the end part of the optical fiber 220 shown in FIG. 8. In other words, the end surface 222a of the core 222 is protruding from the end surface 224a of the clad 224 at the end part of the optical fiber 220 shown in FIG. 8. Accordingly, the core 222 and the clad 224 forms a convex portion 260.

Furthermore, the optical fiber 220 can be made of the same material as that of the optical fiber 120 described in the first exemplary embodiment.

Connecting Part

The connecting part 240 is positioned on the end surface 222a of the core 222 of the optical fiber 220 as FIG. 8 shows. The connecting part 240 can be made of the same material as that of the connecting part 140 described in the first exemplary embodiment.

The connecting part 240 is formed by using the same manufacturing method as that of the connecting part 840 (Refer to FIG. 5) described in the second exemplary embodiment. Concretely to describe, the connecting part 240 can be formed by applying a droplet onto the end surface 222a of the core 222 of the optical fiber 220 to make a connecting part precursor (to be described later) there, and then by hardening the connecting part precursor.

2. Connection Method to Couple Optical Element and Optical Fiber

Figure 9:
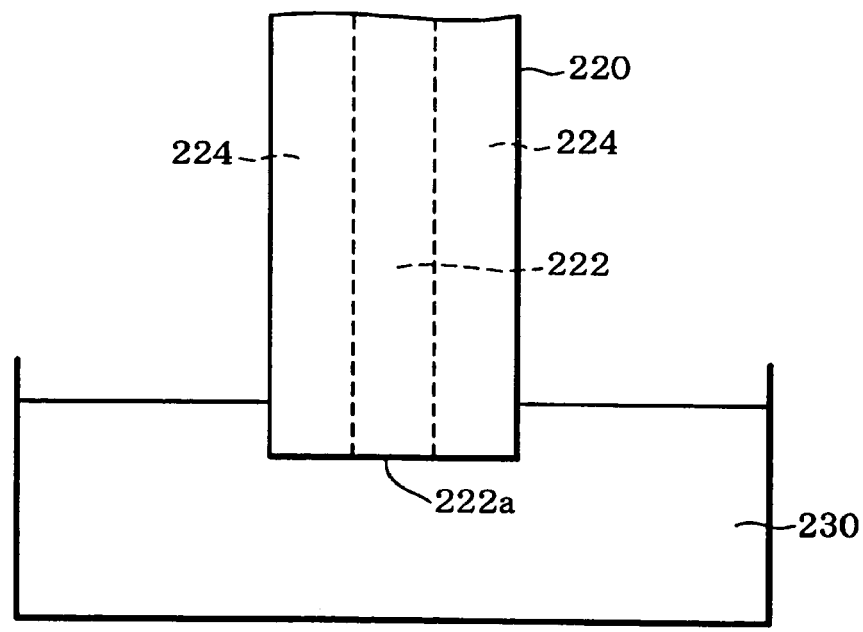
FIG. 9 shows an example of a manufacturing process for an optical fiber illustrated in FIG. 8.
Figure 10:
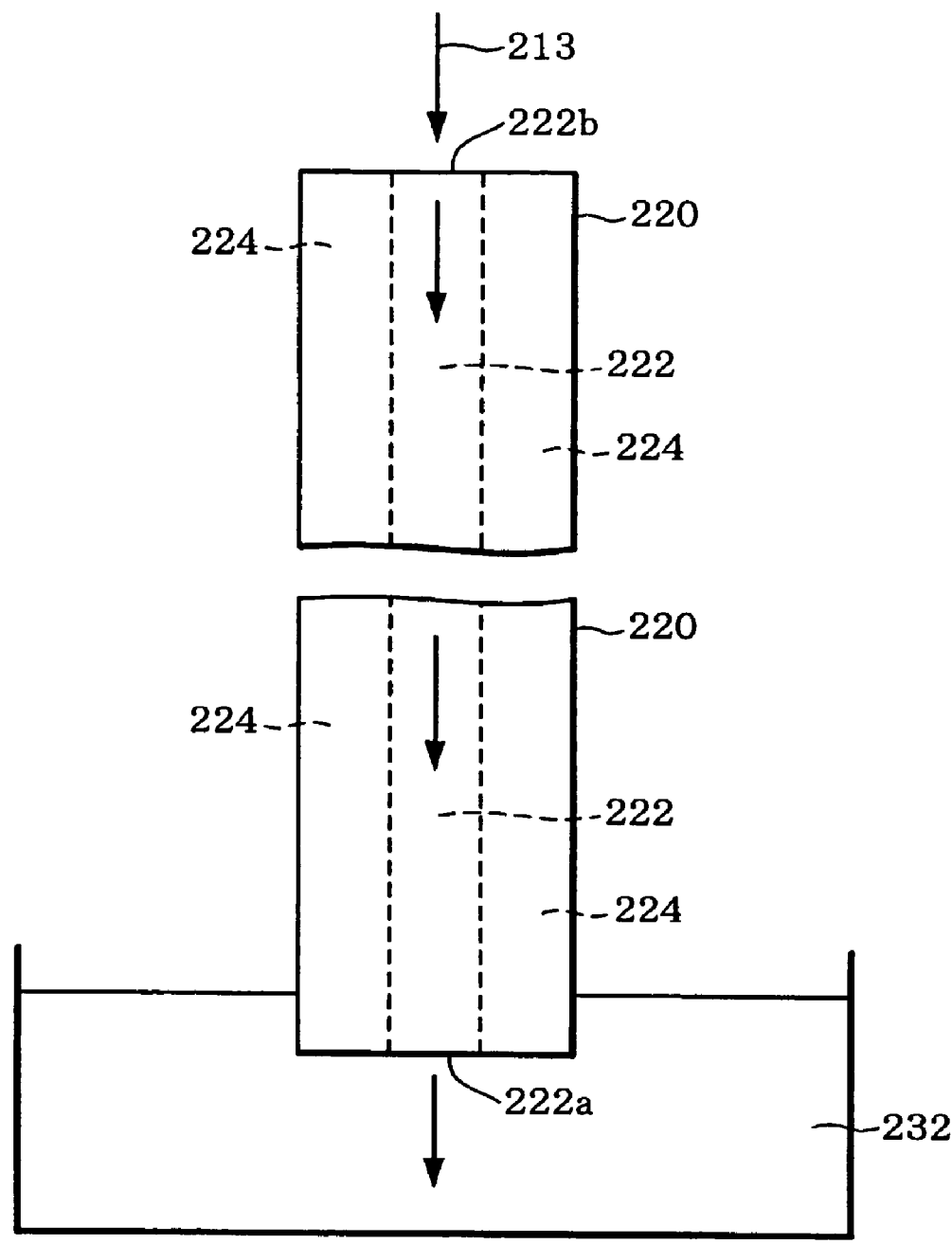
FIG. 10 shows an example of a manufacturing process for an optical fiber illustrated in FIG. 8.
Figure 11:
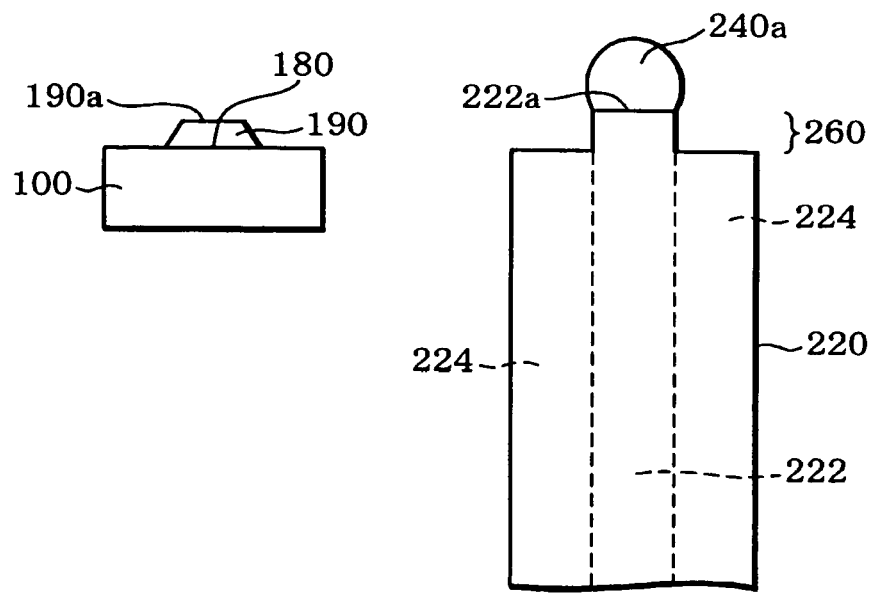
FIG. 11 shows a process of a connection method to couple an optical element and an optical fiber according to the third exemplary embodiment of the invention.

Next, a method of connecting an optical element and an optical fiber shown in FIG. 8 is described by referring to FIG. 9 through FIG. 11. For any process which is the same as that of the connection method to couple an optical element and an optical fiber of the first exemplary embodiment described earlier, the relevant description is omitted as a general rule.

Manufacturing End Surface of Core and Clad

At first, procedures to protrude the end surface 222a of the core 222 from the end surface 224a of the clad 224 are explained below. Concretely to describe, the following methods (1) and (2) are cited as an example to protrude the end surface 222a of the core 222 from the end surface 224a of the clad 224.

(1) Wet Etching Method

First, procedures to protrude the end surface 222a of the core 222 from the end surface 224a of the clad 224 by etching are explained by referring to FIG. 9. The following explanation is made on the premise that the optical fiber 220 is a silica-based fiber.

In general, a core and a clad of an optical fiber are composed of different components in order to have a greater refractive index of the core than that of the clad. Therefore, by making use of the difference in the components of the core and clad, it is possible to selectively remove either the core or the clad by wet etching.

An etchant which selectively removes a part of the clad 224 by implementing wet etching for the optical fiber 220 having its flat end surface (Refer to FIG. 9) is used in this case. This process enables the end surface 222a of the core 222 to get protruded from the end surface 224a of the clad 224.

As an etchant to be used for such a selective etching operation for the core and clad of a silica-based fiber, for example, a solution prepared by blending hydrofluoric acid and ammonium fluoride (buffer fluoric acid solution) can be used. In this case, by adjusting concentrations of hydrofluoric acid and ammonium fluoride in the buffer fluoric acid solution, the clad 224 can selectively be removed.

FIG. 9 illustrates the wet etching operation. As shown in FIG. 9, an end part of the optical fiber 220 is soaked into an etchant 230. By this operation, the clad 224 is selectively dissolved to get removed selectively at the end part of the optical fiber 220.

The clad 224 can be removed by using a buffer fluoric acid solution prepared by blending a 40 wt. % ammonium fluoride solution, a 50 wt. % hydrofluoric acid solution, and pure water ($H_2O$) with specified volume ratios.

It is also possible to selectively remove the core 222 by adjusting concentrations of hydrofluoric acid and ammonium fluoride in the buffer fluoric acid solution. This operation is explained in detail in another exemplary embodiment to be described later.

(2) Photo-Curing Method

Next, procedures to protrude the core 222 by photo-curing are explained by referring to FIG. 10. In this method, a photo-curable resin is positioned at the end surface of the core 222 of the optical fiber 220 to protrude the end surface 222a of the core 222 from the end surface 224a of the clad 224. In this case, there is no specific restriction on the material of the optical fiber 220 as long as the adherence with the photo-curable resin is secured.

An end part (one of the two end parts) of the optical fiber 220 including the end surface 222a is soaked into a liquid material 232 including a precursor component of an ultraviolet curable resin material as FIG. 10 shows. Meanwhile, at the other end part, ultraviolet rays 213 are let in through an end surface 222b of the core 222. Then, the ultraviolet rays 213 let in through the end surface 222b are transmitted inside the core 222, and are emitted from the end surface 222a of the core 222. In this case, no ultraviolet rays are introduced into the clad 224. Therefore, no ultraviolet rays are emitted from the clad 224, and the end surface 222a of the core 222 is the only part that emits the ultraviolet rays 213. As a result, by the ultraviolet rays 213 emitted from the end surface 222a of the core 222, the precursor component of the ultraviolet curable resin material that is included in the liquid material 230 gets reacted at the end surface 222a of the core 222. According to the above operation, the ultraviolet curable resin material is formed at the end surface 222a of the core 222 so that the core 222 becomes elongated. Consequently, the optical fiber 220 is provided with a structure in which the end surface 222a of the core 222 is protruded from the end surface 224a of the clad 224, as shown in FIG. 8.

FIG. 10 shows an example where the core 222 becomes elongated while the end part of the optical fiber 220 is soaked into the liquid material 232. Instead of soaking the end part of the optical fiber 220 into the liquid material 232, it is also possible to position the liquid material 232 onto the end surface 222 of the optical fiber 220 and then let in ultraviolet rays through the other end surface of the core 222 to elongate the core 222 in the same manner as FIG. 10 shows. No figure is shown for this alternative.

Forming Connecting Part

Next, the connecting part 240 is formed on the end surface 222a of the core 222 of the optical fiber 220. Except the point that the connecting part 240 is formed on the end surface 222a of the core 222, the method of forming a connecting part in this exemplary embodiment is the same as that of forming the connecting part 140 in the first exemplary embodiment. Furthermore, the connecting part 240 can be made of the same material as that of the connecting part 140 described in the first exemplary embodiment.

A drop of the liquid material to form the connecting part 240 is dispensed onto the end surface 222a of the core 222 of the optical fiber 220. As a result, the connecting part precursor 240a is formed on the end surface 222a of the core 222 as shown in FIG. 11. Here, while the end surface 222a of the core 222 and the top surface 190a of the base member 190 are kept to face each other, the end surface 222a of the core 222 and the top surface 190a of the base member 190 are closely placed to have a predetermined distance between them, and then the connecting part precursor 240a gets contacted with the top surface 190a of the base member 190. Then, energy is applied to the connecting part precursor 240a under the conditions described above to harden the connecting part precursor 240a. As a result, the connecting part 240 is formed (Refer to FIG. 8).

As a method to harden the connecting part precursor 240a, the same hardening method as that for the connecting part precursor 140a in the first exemplary embodiment can be used. As a result of it, the connection unit of the electro optical element 100 and the optical fiber 220 (the connection unit 3000) is obtained (Refer to FIG. 8).

3. Operation and Effects

Applying a connection structure and a connection method to couple an optical element and an optical fiber of this exemplary embodiment brings the same operation and effects that the connection structure and the connection method of the first exemplary embodiment have.

According to the connection structure and the connection method to couple an optical element and an optical fiber of this exemplary embodiment, the connecting part 240 is formed on the end surface 222a of the core 222 of the optical fiber 220. In the optical fiber 220, light is transmitted only inside the core 222. Namely, since the connecting part 240 is positioned only on the end surface 222a of the core 222, the light is efficiently introduced into the electro optical element 100 from the core 222 through the connecting part 240, when the electro optical element 100 is a light receiving element. If the electro optical element 100 is a light emitting element, the light is efficiently introduced into the core 222 from the electro optical element 100 through the connecting part 240.

4. Modifications

Modifications of the connection structure between an optical element and an optical fiber of this exemplary embodiment will now be explained.

(1) First Modification

Figure 12:
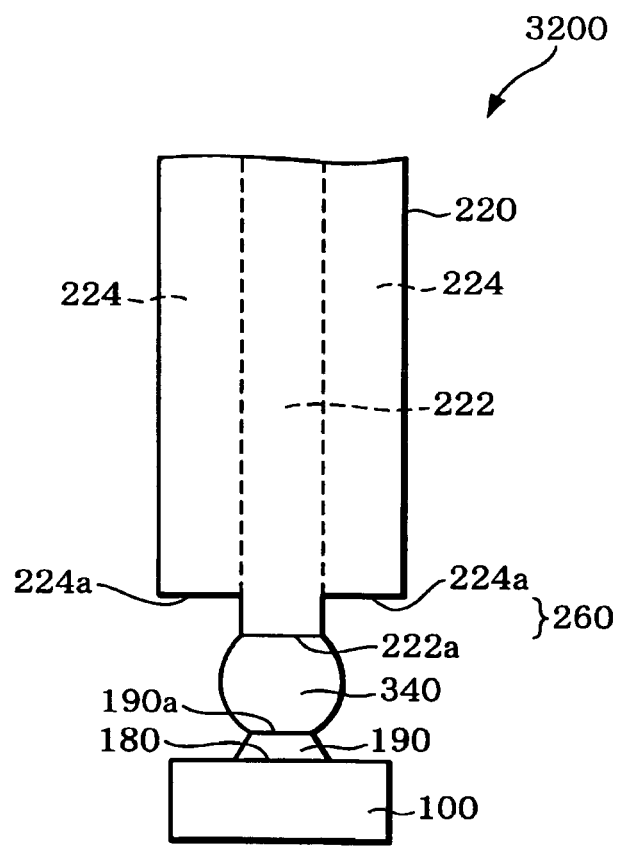
FIG. 12 shows a modification of a connection structure between an optical element and an optical fiber according to the third exemplary embodiment of the invention.
Figure 13A:
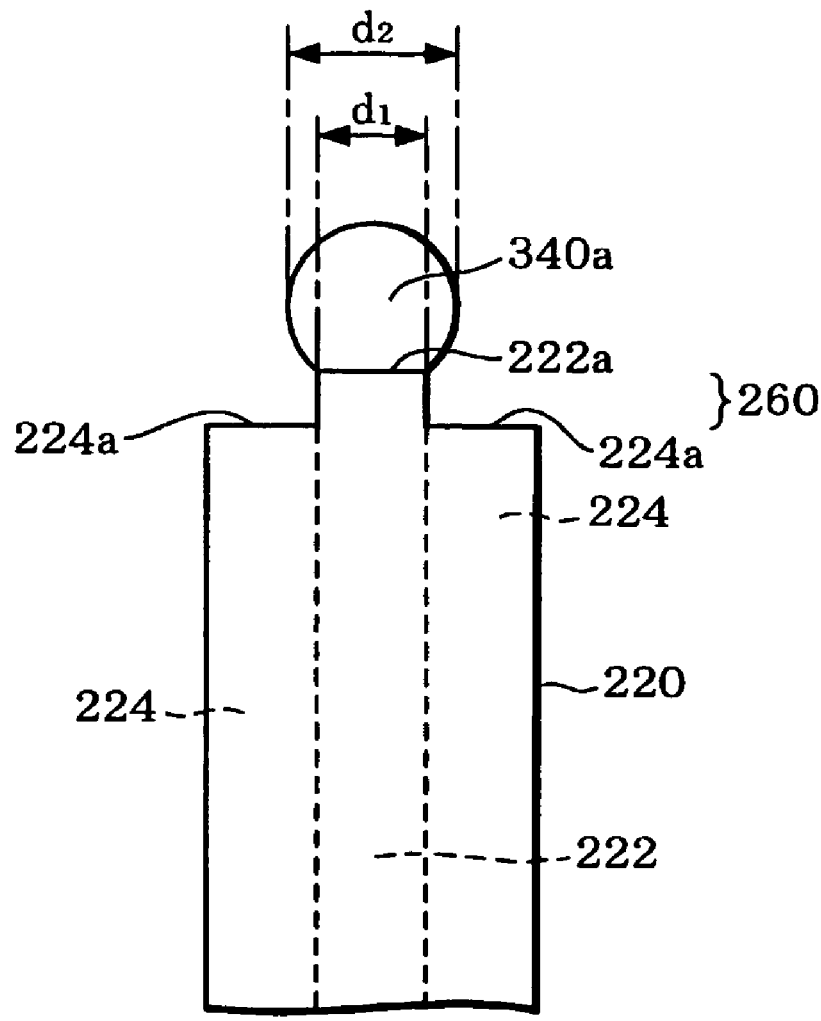
FIG. 13 shows a connection method to couple an optical element and an optical fiber of a modification illustrated in FIG. 12.
Figure 13B:
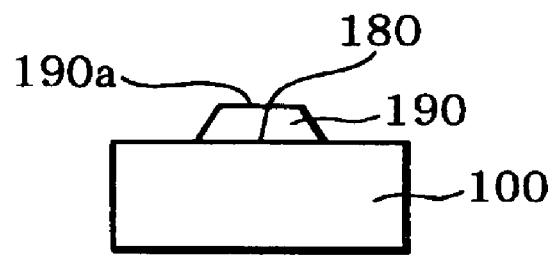

FIG. 12 shows a connection structure between an optical element and an optical fiber as a modification of this exemplary embodiment. FIG. 13 graphically shows a connection method to couple the optical element and the optical fiber of the modification illustrated in FIG. 12, which shows a connection unit 3200 as the connection structure of the modification.

In the connection unit 3200, the shape and size of a connecting part 340 are different from those of the connecting part 240 (Refer to FIG. 8) indicated in this exemplary embodiment. Regarding the other structural components except the point described above, the connection unit 3200 includes the same structure as the connection unit 3000 of FIG. 8 shows.

FIG. 13 illustrates a condition where a connecting part precursor 340a is placed on the end surface 222a of the core 222. By adjusting the shape and size of the connecting part precursor 340a, it is possible to control the shape and size of the connecting part 340.

For example in the optical fiber 222 shown in FIG. 13, a convex is formed by the end surface 222a of the core 222 and the end surface 224a of the clad 224. In this case, when the connecting part precursor 340a is formed on the end surface 222a of the core 222, adjusting the volume of the liquid agent to be used enables the maximum diameter $d_2$ of the connecting part precursor 340a to become greater than the diameter $d_1$, of the end surface 222a. According to this operation, the connecting part 340 can be made still greater. As a result, when the end surface 220a of the core 222 and the optical surface 180 of the electro optical element 100 are coupled, a margin of the distance between the two can be set to be greater.

(2) Second Modification

Figure 14:
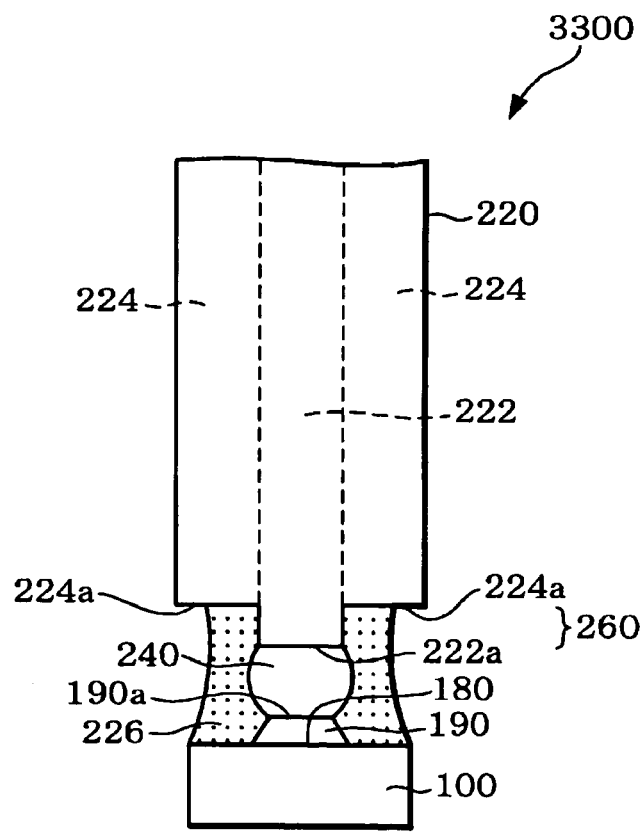
FIG. 14 shows a modification of a connection structure between an optical element and an optical fiber according to the third exemplary embodiment of the invention.

FIG. 14 graphically shows a connection structure between an optical element and an optical fiber as a modification of this exemplary embodiment. FIG. 14 shows a connection unit 3300 as the connection structure between an optical element and an optical fiber.

In the connection unit 3300 shown in FIG. 14; the surrounding area of the protruded section of the core 222, the connecting part 240, and the base member 190 are covered by a sealant 226 at an end part of the connection unit 3000 shown in FIG. 8.

Namely, except the sealant 226, the other structure of connection unit 3300 is the same as that of the connection unit 3000 (Refer to FIG. 8) of this exemplary embodiment. Therefore, the connection unit 3300 is provided with the same operation and effects as the connection unit 3000 has.

Furthermore in the connection unit 3000, the surrounding area of the connecting part 240 is covered by the sealant 226, and then the connecting part 240 is surely fixed between the end surface 222a of the core 222 and the top surface 190a of the base member 190. As a result, a higher yield can be achieved.

In the event, the refractive index of the sealant 226 is preferably lower than those of the core 222, the connecting part 240, and the base member 190. By applying such a structure, the sealant 226 can be provided with a function as a clad to confine the light transmitting inside the core 222, the base member 190, and the connecting part 240 at the end part of the optical fiber 220 shown in FIG. 14.

Furthermore, the refractive index of the connecting part 240 is preferred to be almost equal to that of the core 222, and the refractive index of the sealant 226 is still further preferred to be almost equal to that of the clad 224. For example, by applying such a structure, the connecting part 240 and the sealant 226 can be provided with the functions of the core and the clad of the optical fiber, respectively. The optical loss can be reduced accordingly. In addition, in this case, both of the connecting part 240 and the base member 190 can be provided with a function as a core of an optical fiber by making the refractive index of the base member 190 be almost equal to that of the core 222 as described above.

The descriptions on the refractive indexes mentioned above are also applied to the other exemplary embodiments and modifications.

There is no specific restriction on the material of the sealant 226. For example, a resin material of an ultraviolet cure resin type or a thermosetting cure resin type can be used.

Fourth Exemplary Embodiment

1. Connection Structure between an Optical Element and an Optical Fiber

Figure 15:
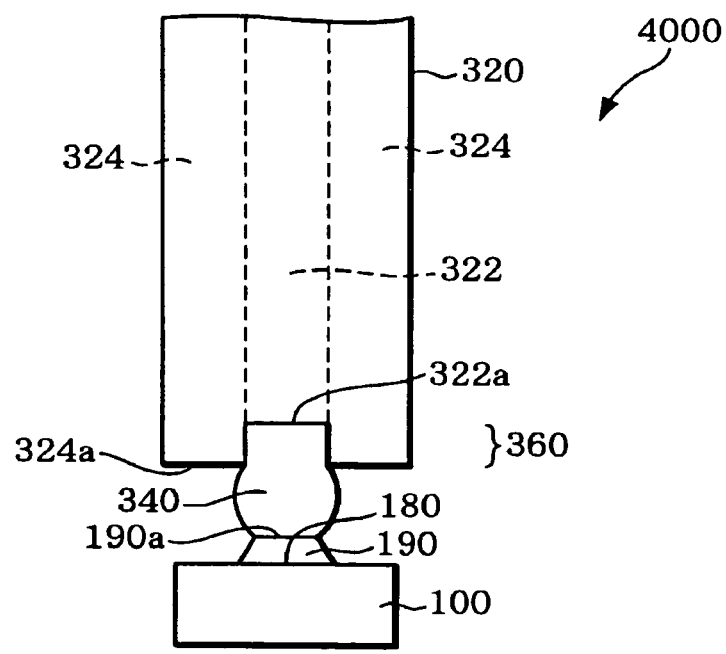
FIG. 15 shows a side view of a connection structure between an optical element and an optical fiber according to a fourth exemplary embodiment of the invention.

FIG. 15 shows a side view of a connection structure between an optical element and an optical fiber according to a fourth exemplary embodiment of the present invention. A connection unit 4000 is indicated in FIG. 15 as a connection structure between an optical element and an optical fiber.

The connection unit 4000 of this exemplary embodiment includes the electro optical element 100, an optical fiber 320, and the connecting part 340 as shown in FIG. 15.

In the connection unit 4000 shown in FIG. 15, an end surface 322a of a core 322 and an end surface 324a of a clad 324 are different from each other in their height at an end part of the optical fiber 320, and the connecting part 340 is positioned on the end surface 322a of the core 322 of the optical fiber 320. In terms of the points described above, the connection unit 4000 is provided with a structure that is the same as the structure of the connection unit 3000 of the third exemplary embodiment.

Meanwhile, in the connection unit 4000 of this exemplary embodiment, the clad 324 does not cover the core 322 at an end part of the optical fiber 320 as FIG. 15 shows. In terms of the point described above, the connection unit 4000 is provided with a structure that is different from the structure of the third exemplary embodiment.

Next, each component of the connection unit 4000 is described below. But as a general rule in the description on the connection unit 4000, any component having the same structure as the corresponding component in the connection unit 3000 of the third exemplary embodiment (Refer to FIG. 8) is provided with the same symbol as given in the connection unit 3000, and any detailed description for the component is omitted.

Optical Fiber

The optical fiber 320 includes the core 322 and the clad 324. This exemplary embodiment shows an example where the clad 324 does not cover the core 322 at the end part of the optical fiber 320 as mentioned above. In other words, the end surface 324a of the clad 324 is protruding from the end surface 322a of the core 322 at the end part of the optical fiber 320, as shown in FIG. 15, so that a concave portion 360 is composed there of the core 322 and the clad 324.

The optical fiber 320 can be made of the same material as that of the component mentioned as the optical fiber 120 in the first exemplary embodiment.

Connecting Part

The connecting part 340 is positioned on the end surface 322a of the core 322 of the optical fiber 320 as FIG. 15 shows. The connecting part 340 can be made of the same material as that of the connecting part 240 (Refer to FIG. 8) described in the third exemplary embodiment.

Furthermore, the connecting part 340 is formed by using the same manufacturing method as that for the connecting part 240 described in the third exemplary embodiment. Concretely to describe, the connecting part 340 can be formed by applying a liquid agent onto the end surface 322a of the core 322 of the optical fiber 320 to make a connecting part precursor (to be described later) there, and then by hardening the connecting part precursor.

2. Connection Method to Couple Optical Element and Optical Fiber

Figure 16:
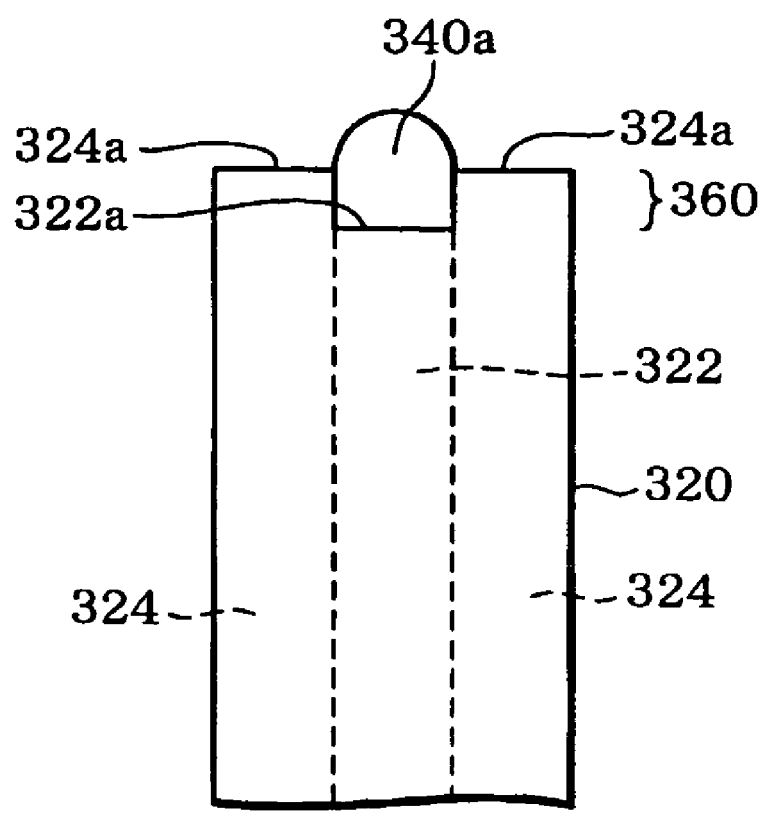
FIG. 16 shows a process of a connection method to couple an optical element and an optical fiber according to the fourth exemplary embodiment of the invention.

A method of connecting an optical element and an optical fiber shown in FIG. 15 is described by referring to FIG. 16. For any process, which is the same for the connection method to couple an optical element and an optical fiber of the third exemplary embodiment described earlier, the relevant description is omitted as a general rule.

Manufacturing End Surface of Core and Clad

In this exemplary embodiment, the end surface of the core 322 and the clad 324 of the optical fiber 320 can be manufactured by the wet etching method described as one of the methods for the third exemplary embodiment. While controlling the types and concentrations of the components, of which the etchant is composed, etching operation is implemented to selectively remove the core 322 by the wet etching method.

For example, if the optical fiber 320 is configured with a silica-based fiber and a buffer fluoric acid solution is used as an etchant, the core 322 can selectively be removed by adjusting concentrations of hydrofluoric acid and ammonium fluoride in the buffer fluoric acid solution.

A solution for the use of removing the clad in the second exemplary embodiment can be used, while concentrations of the components in the solution are adjusted.

Forming Connecting Part

Next, the connecting part precursor 340a is formed on the end surface 322a of the core 322 of the optical fiber 320. In this exemplary embodiment, the method of forming the connecting part 340 is the same as that of forming the connecting part 240 in the third exemplary embodiment. Furthermore, the connecting part precursor 340a can be realized with the same material as that of the connecting part precursor 140a (Refer to FIG. 4) described in the first exemplary embodiment.

Concretely to describe, a drop of the liquid material to form the connecting part 340 is dispensed onto the end surface 322a of the core 322 of the optical fiber 320 to form the connecting part precursor 340a on the end surface 322a of the core 322, as shown in FIG. 16. Here, while the end surface 322a of the core 322 and the top surface 190a of the base member 190 (Refer to FIG. 15) are kept to face each other, the end surface 322a of the core 322 and the top surface 190a of the base member 190 are placed to be close each other to have the specified distance between them, and then the connecting part precursor 340a gets contacted with the top surface 190a of the base member 190. Then, energy is charged to the connecting part precursor 340a under the conditions described above to harden the connecting part precursor 340a. As a result of it, the connecting part 340 is formed. According to the above operation, a connection structure between the electro optical element 100 and the optical fiber 320 (connection unit 4000) is obtained (Refer to FIG. 15).

3. Operation and Effects

Applying a connection structure and a connection method to couple an optical element and an optical fiber of this exemplary embodiment brings the same operation and effects that the connection structure and the connection method of the first exemplary embodiment have.

According to the connection structure and the connection method to couple an optical element and an optical fiber of this exemplary embodiment, the clad 324 does not cover the core 322 at an end part of the optical fiber 320 as FIG. 15 shows. In other words, the concave portion 360 is composed there of the core 322 and the clad 324. Since the connecting part 340 is positioned at the concave portion 360, the connecting part 340 is surely fixed there. As a result, a higher yield can be achieved.

Fifth Exemplary Embodiment

Figure 18:
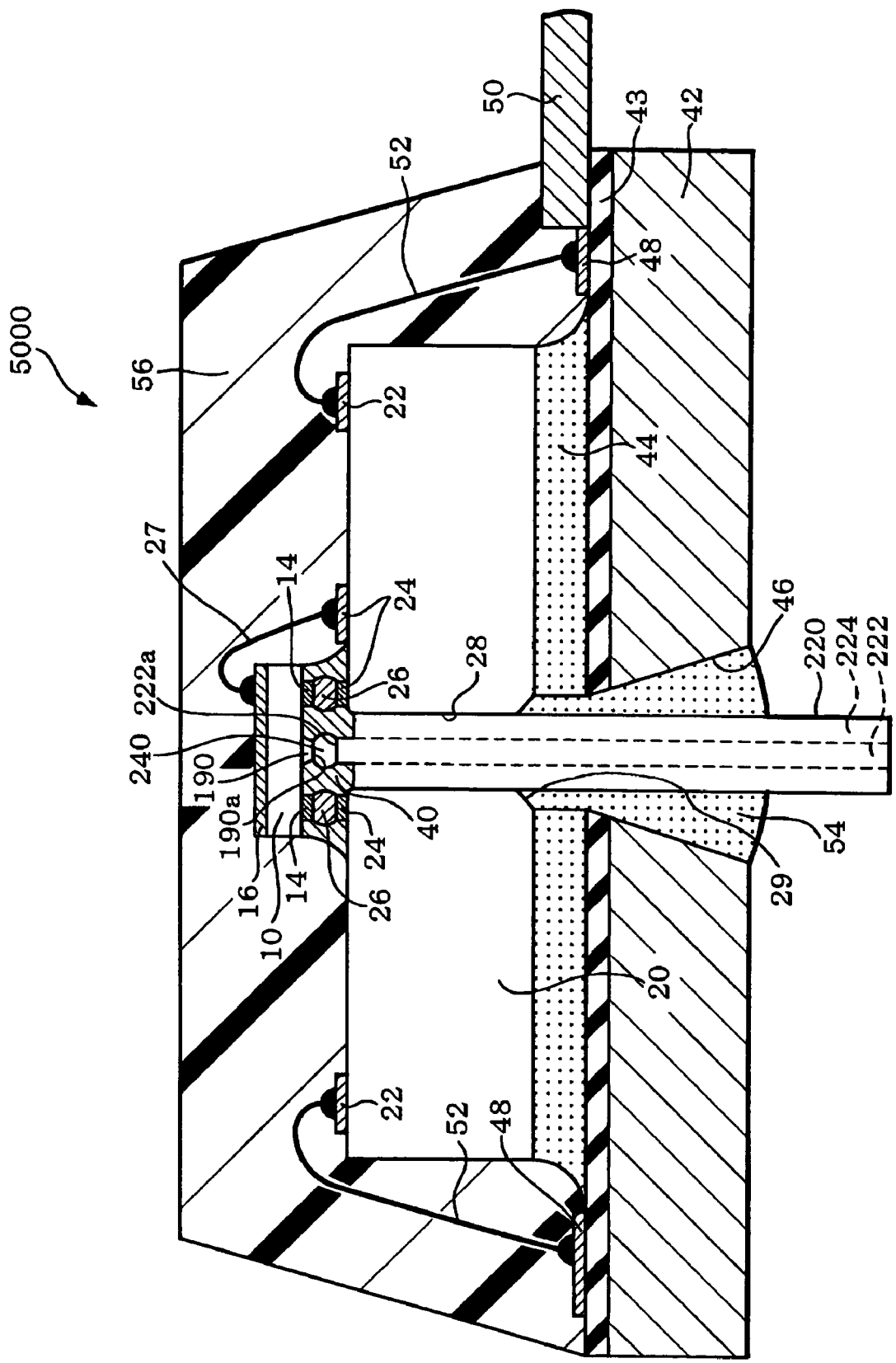
FIG. 18 shows an optical module according to a fifth exemplary embodiment of the invention.

FIG. 18 shows an optical module 5000 of a fifth exemplary embodiment of the present invention. The optical module 5000 includes, an optical element 10, a semiconductor chip 20, and the optical fiber 220 of the third exemplary embodiment (Refer to FIG. 8).

As FIG. 18 shows, the optical module 5000 of this exemplary embodiment includes a connection structure, which is composed of the optical element 10, the optical fiber 220, and the connecting part 240.

The optical module 5000 includes the same connection structure as that of the third exemplary embodiment (the connection unit 3000). The optical fiber 220 and the connecting part 240 (Refer to FIG. 18) have the same structure as what the connection unit 3000 of the third exemplary embodiment (Refer to FIG. 8) includes. Instead of the electro optical element 100 (Refer to FIG. 8) that the connection unit 3000 of the third exemplary embodiment includes, the optical element 10 is placed in the optical module 5000 of this exemplary embodiment as FIG. 18 shows.

In this optical module 5000, any of the optical fibers mentioned in the modifications and other exemplary embodiments described earlier can be used instead of the optical fiber 220.

1. Structure of Optical Module

The electro optical element 10 is a light emitting element or a light receiving element. As an example of the light emitting element; a surface emitting element, such as a surface emitting laser in particular, is applied. A surface emitting element, such as a surface emitting laser, emits light beams in a direction perpendicular to a substrate. The base member 190 is provided on an optical surface of the electro optical element 10. The connecting part 240 is provided on the top surface 190a of the base member 190.

The electro optical element 10 is coupled to the optical fiber 220 through the base member 190 and the connecting part 240. Meanwhile, the top surface 190a of the base member 190 is positioned so as to face the core 222 of the optical fiber 220. Furthermore in this exemplary embodiment, the base member 190 is positioned so as to face a hole 28 of the semiconductor chip 20.

The electro optical element 10 has at least one electrode (usually two or more electrodes). For example, a first electrode 14 can be positioned on a surface of the electro optical element 10 where the base member 190 is placed. When the first electrode 14 includes a plurality of first electrodes, at least one electrode can be a dummy electrode. The dummy electrode can be made of the same material as that of the first electrode 14, and it is not electrically coupled to the internal part of the electro optical element 10. For example, when the first electrode 14 is formed at the corners on a polygon that has three or more corners and is drawn with all straight lines, at least one of the electrodes can be a dummy electrode. With to the structure described above, the electro optical element 10 can stably be supported with three or more points.

Regarding the electro optical element 10; while the first electrode 14 being positioned on a surface part of the optical element, a second electrode 16 is positioned on another surface part. When the electro optical element 10 is a semiconductor laser such as a surface emitting laser or equivalent, the second electrode 16 is positioned on another surface part of the electro optical element 10 that is opposite to the surface part where the first electrode 14 is positioned.

The semiconductor chip 20 is to operate the electro optical element 10. A circuit to operate the electro optical element 10 is embedded in the semiconductor chip 20. On the semiconductor chip 20, multiple electrodes (or pads) 22 are formed and they are electrically coupled to an internal circuit of the chip. On the surface where the electrodes 22 are formed, it is preferred to have a wiring pattern 24 electrically coupled to at least one of the electrodes 22.

The semiconductor chip 20 and the wiring patterns 24 are coupled electrically. For example, the first electrode 14 of the electro optical element 10 is electrically coupled to the wiring pattern 24 formed on the semiconductor chip 20. Though they can be coupled with wire, it is also possible to connect the first electrode 14 and the wiring pattern 24 with metallic connection by a solder section 26 of a brazing material or equivalent or an anisotropic conductive material (film). In this case, the electro optical element 10 is mounted face-down onto the semiconductor chip 20. With this structure, the solder section 26 does not only connect them electrically but is also able to stably fix the electro optical element 10 and the semiconductor chip 20. Among the first electrode 14, the dummy electrode is also preferably coupled to the wiring pattern 24. With this structure, the electro optical element 10 can be stably fixed onto the semiconductor chip 20.

Furthermore, the second electrode 16 of the electro optical element 10 is electrically coupled to the wiring pattern 24. For connecting them, a wire 27 is used or a conductive paste is placed from the second electrode 16 to the wiring pattern 24.

Between the electro optical element 10 and the semiconductor chip 20, an under-fill material 40 is placed. The under-fill material 40 covers the electrically connecting part between the electro optical element 10 and the semiconductor chip 20 to protect the connecting part, and it also protects the surfaces of the electro optical element 10 and the semiconductor chip 20. Furthermore, the under-fill material 40 has a function of retaining the connecting condition between the electro optical element 10 and the semiconductor chip 20.

In addition, the under-fill material 40 has a function as a sealant to fix the part between the connecting part 240 and the optical fiber 220. The refractive index of the under-fill material 40 is preferably lower than those of the core 222 of the optical fiber 220, the base member 190, and the connecting part 240. By applying such a structure, the under-fill material 40 is provided with a function as a clad to confine the light transmitting inside the core 222, the base member 190, and the connecting part 240.

Furthermore, the refractive indexes of the connecting part 240, the base member 190, and the core 222 are preferred to be almost equal, and the refractive index of the under-fill material 40 is still further preferred to be the same as that of the clad 224. In other words, by applying such a structure, the connecting part 240 and the base member 190 can be provided with the function of a core of an optical fiber, while the under-fill material 40 can be provided with the function of a clad of an optical fiber.

A hole 28 (for example, a through hole) is formed in the semiconductor chip 20. The optical fiber 220 is inserted into the hole 28, while the connecting part 240 is positioned at the end surface 222a of the core 222 of the optical fiber 220. The hole 28 goes through from the surface, where the electrodes 22 are formed, to the opposite surface while the hole is keeping clear of any internal circuit. It is preferred that at least either of the hole inlets of the hole 28 has a taper section 29, with which it becomes easier to insert the optical fiber 220 into the hole 28.

The semiconductor chip 20 is mounted on a substrate 42. To describe in detail, the semiconductor chip 20 is mounted on the substrate 42 through an adhesive 44. The substrate 42 is provided with a hole 46, which is so placed at a position as to meet the hole 28 of the semiconductor chip 20. The adhesive 44 bonding the semiconductor chip 20 and the substrate 42 together is placed so as not to interfere with the meeting of the two holes, i.e., the holes 28 and 46, and not to clog the holes. The hole 46 of the substrate 42 is formed with a taper section that has a larger inner diameter toward the opposite direction away from the semiconductor chip 20. With the taper section, it becomes easier to insert the optical fiber 220.

The substrate 42 is made of either an electrically insulating material, such as resin, glass and ceramic, or a conductive material, such as metal. When the substrate 42 is made of a conductive material, it is preferred to place an insulating film 43 onto at least the surface where the semiconductor chip 20 is mounted. Also in the following exemplary embodiment, the same material as mentioned above is used for a material of the substrate 42.

The substrate 42 is preferably provided with high thermal conductivity. With this structure, the substrate 42 promotes radiation of the heat from at least either of the electro optical element 10 and the semiconductor chip 20. In this case, the substrate 42 functions as a heat sink or a heat spreader. In this exemplary embodiment, the semiconductor chip 20 is bonded onto the substrate 42, and then the semiconductor chip 20 can be cooled directly. Here, the adhesive 44 bonding the semiconductor chip 20 and the substrate 42 together is preferably provided with thermal conductivity. Furthermore, as the semiconductor chip 20 gets cooled, the electro optical element 10 coupled to the semiconductor chip 20 is also cooled.

The substrate 42 is provided with a wiring pattern 48 and an external terminal 50. In this exemplary embodiment, the external terminal 50 is a lead. The wiring pattern 48 positioned on the substrate 42 is electrically coupled to at least one of the following components; i.e., the electrodes 22 of the semiconductor chip 20, the wiring pattern 24 placed on the semiconductor chip 20, the first electrode 14 and second electrode 16 of the electro optical element 10; for example through a wire 52. In this case, the wiring pattern 48 can electrically be coupled to the external terminal 50 as well.

The optical fiber 220 is inserted into the hole 28 of the semiconductor chip 20. The top surface 190a of the base member 190 is facing the hole 28 of the semiconductor chip 20. Therefore, the optical fiber 220 inserted into the hole 28 becomes aligned to the top surface 190a of the base member 190.

The optical fiber 220 is also inserted into the hole 46 of the substrate 42. The hole 46 has its inner diameter narrow gradually toward the hole 28 of the semiconductor chip 20. Meanwhile, the hole 46 has an inner diameter of its opening expand so as to have a diameter greater than the optical fiber 220 at the other side surface opposite from the semiconductor chip 20. The gap between the optical fiber 220 and the hole 46 is preferably filled up with a filler 54 of a resin material or equivalent. The filler 54 fixes the optical fiber 220, and has a function to prevent the optical fiber from coming out.

In this exemplary embodiment, the electro optical element 10 and the semiconductor chip 20 are sealed with a resin 56, which also seals the electrically connecting parts between the electro optical element 10 and the semiconductor chip 20, as well as the electrically connecting parts between the semiconductor chip 20 and the wiring pattern 48 positioned on the substrate 42.

2. Operation and Effects

By applying the optical module 5000 of this exemplary embodiment, the electro optical element 10 and the optical fiber 220 are coupled through the base member 190 and the connecting part 240. Therefore, being compared with an ordinary optical module additionally equipped with a lens between the optical fiber and optical element, applying the optical module 5000 makes it possible to realize a simplified, downsized and low-cost unit.

Furthermore, being compared with an ordinary optical module additionally equipped with a lens between the optical fiber and optical element, applying this optical module 5000 makes it possible to surely secure optical transmission between the electro optical element 10 and the optical fiber 220 through the base member 190 and the connecting part 240.

Sixth Exemplary Embodiment

Figure 21:
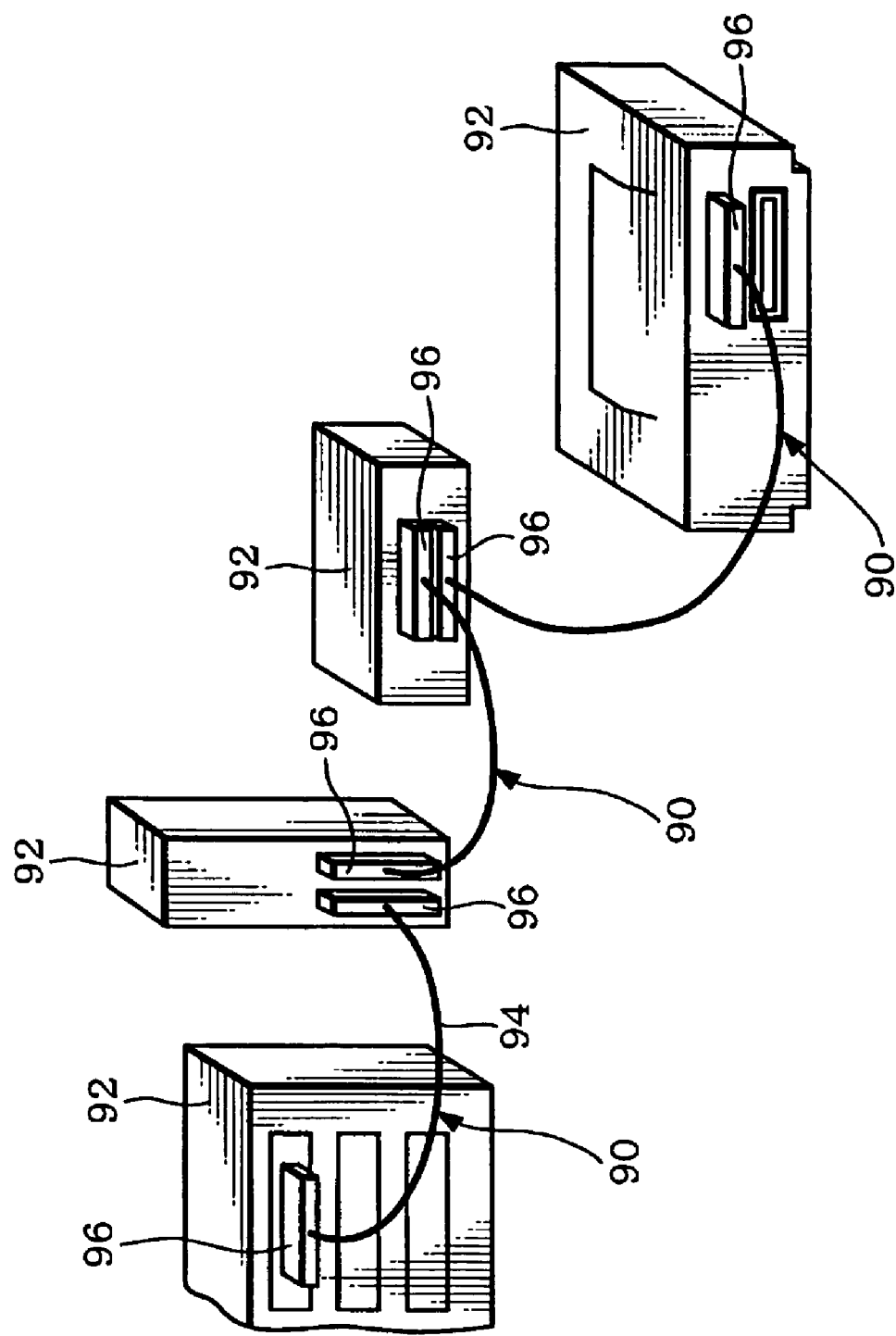
FIG. 21 shows an optical communication system according to a sixth exemplary embodiment of the invention.

FIG. 21 shows an optical communication system of an exemplary embodiment of the present invention. An optical transmission unit 90 connects electronic devices 92, such as a computer, a display, a memory device, a printer and so on. The electronic devices 92 can be information technology equipment. The optical transmission unit 90 can be a cable 94 equipped with a plug 96 at each cable end. Either or both of the ends of the cable 94 can be equipped with a connection structure between the electro optical element 100 and the optical fiber 120 of the first exemplary embodiment (i.e., the connection unit 1000; Refer to FIG. 1(A)). The plug 96 has a semiconductor chip 20 in it. The installation condition of the optical fiber 120 and the electro optical element 100 or the semiconductor chip 20 is as described above. In this case, instead of the connection structure between the electro optical element 100 and the optical fiber 120 of the first exemplary embodiment, any connection structure of the modifications and other exemplary embodiments described above can be applied.

The electro optical element 100 equipped at either end of the optical fiber 120 is a light emitting element. An electric signal output from the electronic devices 92 at one end is converted into an optical signal by the light emitting element of the electro optical element 100. The optical signal gets transmitted through the optical fiber 120 and is input into the electro optical element 100 at another end, which is a light receiving element. The input signal is converted into an electric signal, which is sent into the electronic devices 92 at another end. In this manner, using the optical transmission unit 90 of this exemplary embodiment makes it possible to communicate information data between the electronic devices 92 with optical signal.

Seventh Exemplary Embodiment

Figure 22:
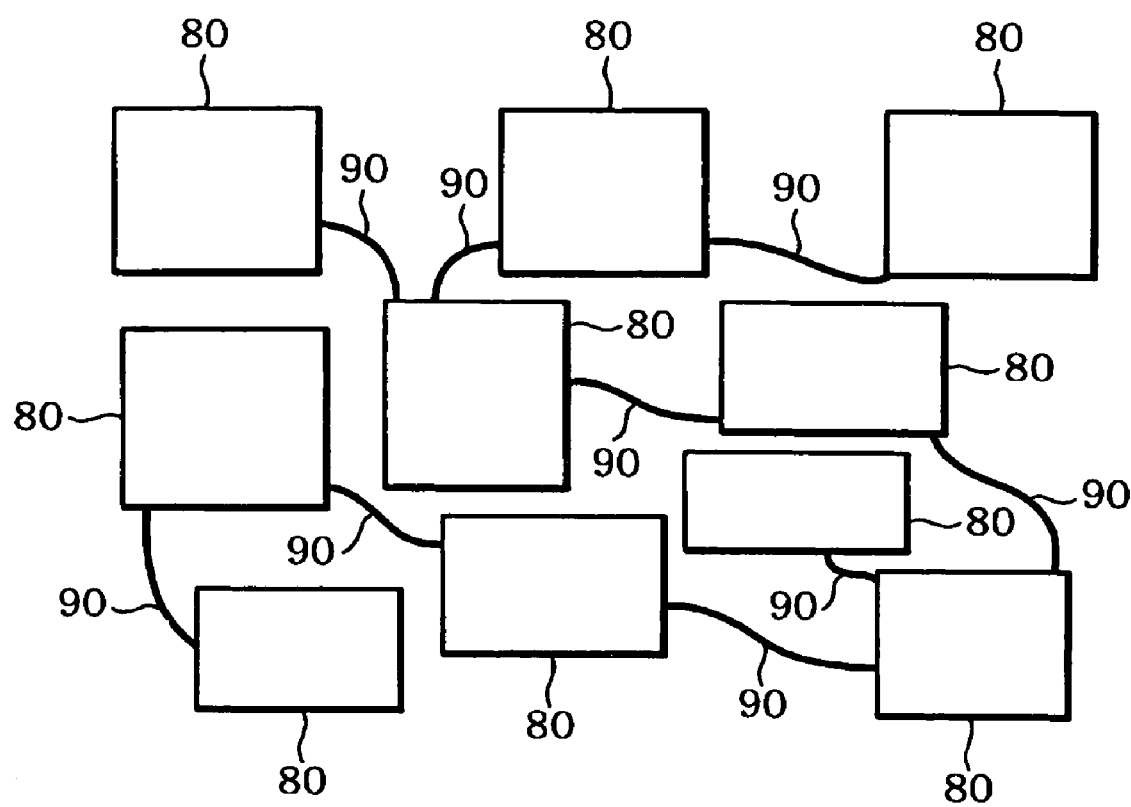
FIG. 22 shows an implementation format of an optical communication system according to a seventh exemplary embodiment of the invention.

FIG. 22 shows an implementation format of an optical communication system of an exemplary embodiment of the present invention. The optical transmission unit 90 connects electronic devices 80, for example; i.e., an LCD monitor, or a digital-communication-compatible CRT (which are sometimes used in the business sectors of finance industry, mail-order business, medical industry, and education), an LCD projector, a plasma display panel (PDP), a digital TV, a cash register for retailers (for Point of Sale Scanning (POS)), a VCR, a tuner, a video game machine, a printer and so on.

The present invention is not restricted only to the exemplary embodiments described above, but various other modifications can also be applicable. For example, the present invention includes other structures as well that are practically the same as any structure mentioned above in the descriptions for the exemplary embodiments (For example, a structure in which the function, method and result are the same, or a structure in which the purpose and result are the same). Furthermore, the present invention includes other structures as well in which details of any structure of the exemplary embodiments mentioned above are replaced. In addition, the present invention includes other structures as well that result in the same operation and effects as any structure of the exemplary embodiments mentioned above, or that are able to achieve the same purposes. Moreover, the present invention includes other structures as well in which publicly known technologies are added to any structure of the exemplary embodiments mentioned above.

What is claimed is:

1. A connection structure, comprising:
    an optical element including an optical surface;
    a base member that is formed on the optical surface;
    an optical fiber including a core and a clad; and
    a connecting part that joins an end surface of the optical fiber and a top surface of the base member,
    a maximum cross section of the connecting part is larger than (1) a contact surface between the connecting part and the optical fiber, and (2) a contact surface between the connecting part and the base member.

2. The connection structure according to claim 1, a refractive index of the connecting part being almost equal to a refractive index of the core of the optical fiber.

3. The connection structure according to claim 1, the refractive index of the connecting part being greater than a refractive index of the clad of the optical fiber.

4. The connection structure according to claim 1, a height of the end surface of the core being different from a height of an end surface of the clad at an end part of the optical fiber that is joined to the connecting part.

5. The connection structure according to claim 4, portion of the core is not covered by the clad at the end part.

6. The connection structure according to claim 5, the core and the clad forming a convex portion at the end part.

7. The connection structure according to claim 5, an area that surrounds the connecting part being covered by a sealant at the end part.

8. The connection according to claim 7, a refractive index of the sealant being smaller than the refractive index of the core of the optical fiber and the refractive index of the connecting part.

9. The connection structure according to claim 8, the refractive index of the connecting part being almost equal to the refractive index of the core of the optical fiber, and the refractive index of the sealant being almost equal to the refractive index of the clad of the optical fiber.

10. The connection structure according to claim 4, an inner wall of the clad does not cover the core at the end part.

11. The connection structure according to claim 10, the core and the clad forming a convex portion at the end part.

12. The connection structure according to claim 1, the connecting part being formed by hardening a liquid material that is hardened by charging energy.

13. The connection structure according to claim 12, the connecting part being composed of ultraviolet curable resin.

14. The connection structure according to claim 1, the optical element being any one of a surface emitting semiconductor laser, a semiconductor light emitting diode, an electroluminescent device, and a photo diode.

15. The connection structure according to claim 1, the base member being composed of a material where light of a predetermined wavelength goes through.

16. The connection structure according to claim 1, a planer shape of the top surface of the base member being circular or oval.

17. The connection structure according to claim 1, a cross-sectional shape of the top surface of the base member being a curved surface.

18. The connection structure according to claim 1, the top surface of the base member making an acute angle with a surface that intersects the top surface at a side part of the base member.

19. The connection structure according to claim 1, the upper part of the base member being formed in a reverse taper manner.

20. The connection structure according to claim 1, a refractive index of the base member being almost equal to the refractive index of the connecting part.

21. An optical module, comprising:
the connection structure according to claim 1; and
a semiconductor chip that is electrically coupled to the optical element.

22. An optical transmission unit, comprising:
an optical fiber;
a light emitting element that includes an emitting plane and lets a light that is emitted from the emitting plane into an end surface of the optical fiber;
a semiconductor chip that is electrically coupled to the light emitting element;
a light receiving element that includes a plane of incidence and introduces a light that is emitted from the other end surface of the optical fiber through the plane of incidence; and
a semiconductor chip that is electrically coupled to the light receiving element; and
at least one of the connection structure between the light emitting element and the optical fiber, and the connection structure between the light receiving element and the optical fiber being the connection structure according to claim 1.

23. The optical transmission unit according to claim 22, further comprising:
another base member, at least a part of the connecting part being provided on the another base member.

24. The connection structure according to claim 1,
an edge surface of the optical fiber has a convex portion, and
the connecting part connects between an edge surface of the convex portion and the upper surface of the base member,
wherein a sealant covers (1) the connecting part, (2) side portions of the convex portion, (3) an edge surface of the optical fiber except for the convex portion, (4) side portions of the base member, and (5) the upper surface of the optical element other than the base member.

25. The connection structure according to claim 1, an optical axis of the optical fiber and an optical axis of the optical element are out of alignment.

26. A connection method to couple an optical element and an optical fiber, comprising:
(a) forming a connecting part precursor by applying a liquid agent to at least one of an end surface of the optical fiber and a top surface of a base member that is formed on an optical surface of the optical element; and
(b) forming a connecting part by hardening the connecting part precursor while joining the end surface of the optical fiber and the top surface of the base member via the connecting part precursor,
a maximum cross section of the connecting part is larger than (1) a contact surface between the connecting part and the optical fiber, and (2) a contact surface between the connecting part and the base member.

27. The connection method to couple an optical element and an optical fiber according to claim 26, (b) further comprising:
joining the end surface of the optical fiber and the top surface of the base member via the connecting part precursor while making at least a part of the end surface of the optical fiber face the top surface of the base member.

28. A connection method to couple an optical element and an optical fiber, comprising:
(a) forming a connecting part precursor by applying a liquid agent to at least one of an end surface of a core of the optical fiber and a top surface of a base member that is formed on an optical surface of the optical element; and
(b) forming a connecting part by hardening the connecting part precursor while joining the end surface of the core and the top surface of the base member via the connecting part precursor,
a maximum cross section of the connecting part is larger than (1) a contact surface between the connecting part and the optical fiber, and (2) a contact surface between the connecting part and the base member.

29. The connection method to couple an optical element and an optical fiber according to claim 28, (b) further comprising:
joining the end surface of the core and the top surface of the base member via the connecting part precursor while making at least a part of the end surface of the core face the top surface of the base member.

30. The connection method to couple an optical element and an optical fiber according to claim 28, the connecting part precursor being hardened by charging energy.

* * * * *